US007789334B2

(12) United States Patent
Wada et al.

(10) Patent No.: US 7,789,334 B2
(45) Date of Patent: Sep. 7, 2010

(54) SHREDDING MACHINE AND SHREDDING METHOD

(75) Inventors: Naoya Wada, Miki (JP); Katsu Matsumoto, Miki (JP); Natsuki Takemoto, Miki (JP); Takashi Ashino, Miki (JP); Masuyuki Mieda, Miki (JP)

(73) Assignee: Kabushiki Kaisha Kinki, Hyogo (JP)

( * ) Notice: Subject to any disclaimer, the term of this patent is extended or adjusted under 35 U.S.C. 154(b) by 734 days.

(21) Appl. No.: 10/589,927

(22) PCT Filed: Feb. 17, 2005

(86) PCT No.: PCT/JP2005/002464

§ 371 (c)(1), (2), (4) Date: Jun. 5, 2007

(87) PCT Pub. No.: WO2005/079991

PCT Pub. Date: Sep. 1, 2005

(65) Prior Publication Data

US 2007/0241216 A1 Oct. 18, 2007

(30) Foreign Application Priority Data

Feb. 19, 2004 (JP) ............................ 2004-043270
Aug. 25, 2004 (WO) ................ PCT/JP2004/012582

(51) Int. Cl.
*A47J 17/18* (2006.01)

(52) U.S. Cl. ...................................... 241/166; 241/236

(58) Field of Classification Search ................. 241/261, 241/261.1, 166, 186.2, 186.5, 285.2, 285.3, 241/236
See application file for complete search history.

(56) References Cited

U.S. PATENT DOCUMENTS 2,671,646 A * 3/1954 Lindsey ...................... 366/149
2,998,834 A * 9/1961 Carlson et al. ................ 241/34
4,284,247 A * 8/1981 Eriksson .................. 241/260.1
4,607,797 A * 8/1986 Enikolopow et al. .......... 241/23
4,691,871 A * 9/1987 Mochizuki .................. 241/166
4,839,193 A * 6/1989 Mange et al. ............... 426/633

(Continued)

FOREIGN PATENT DOCUMENTS

JP 51-71557 6/1976

(Continued)

OTHER PUBLICATIONS

An International Search Report dated May 11, 2005, from the International Bureau in corresponding International (PCT) Application No. PCT/JP2005/02464.

*Primary Examiner*—Faye Francis
(74) *Attorney, Agent, or Firm*—Fitch, Even, Tabin & Flannery

(57) ABSTRACT

In order to finely crush a shredable object, two rotational shafts for supporting cutting blades are provided in parallel in the transverse direction inside a shredder main body. The cutting blades that are provided with a plurality of cutting portions protruding from outer peripheral thereof are disposed in the shaft direction of the two rotational shafts so that these cutting portions engage with each other. A throw-in port for a shredable object is provided in one end portion of the rotational shafts in an upper portion of the shredder main body in the shaft direction. A discharge port for the shredable object is provided in the other end portion of the rotational shafts in a lower portion of this shredder main body in the shaft direction. Transverse feeding members for forwarding the shredable object that is thrown into the throw-in port and crushed by the cutting blades, to a discharge port side is provided and, thereby shredding the shredable object for a plurality of times inside the shredder main body.

46 Claims, 24 Drawing Sheets

U.S. PATENT DOCUMENTS 4,903,903 A * 2/1990 Benen .................. 241/101.76
5,381,730 A * 1/1995 Kim ............................ 99/510
5,680,998 A * 10/1997 Mason et al. .......... 241/101.76
5,683,044 A * 11/1997 Gueldenpfennig et al. .... 241/73
6,149,083 A * 11/2000 McFarland ................. 241/82.5
6,685,118 B1 * 2/2004 Williams, Jr. ............... 241/232

FOREIGN PATENT DOCUMENTS

JP 54-156261 12/1979
JP S54-156262 A 12/1979
JP 55-156261 1/1980
JP 59-115445 8/1984
JP 59-115546 8/1984
JP 5-23609 2/1993
JP 6-87305 12/1994
JP H07-004555 B2 1/1995
JP 7-256128 10/1995
JP 8-323232 12/1996
JP 11-216384 8/1999
JP 2001-198485 A 7/2001
JP 2004-25076 1/2004
JP 2004-267944 A 9/2004

* cited by examiner

SHREDDING MACHINE AND SHREDDING METHOD

TECHNICAL FIELD

The present invention relates to a shredding machine for shredding various kinds of shredable objects by a shearing action of cutting blades, and more specifically, to a shredding machine capable of finely shredding the shredable object, and a shredding method thereof.

BACKGROUND ART

Conventionally, a shredding machine (shredder) that crushes any shredable objects, such as plastic and wood pieces (e.g., waste plastics, scrap woods, shredder dust, tires, and mattresses), papers, metals, rubbers, fibers, and leather, is known.

As this kind of a shredding machine, there is one disclosed in, for example, Patent Document #1, which the applicant has filed earlier. This shredding machine, as shown in a plan view showing the shredding machine of FIG. 22, a vertical cross-sectional side view of the shredding machine of FIG. 23, and a XXIV-XXIV cross-sectional view thereof in FIG. 24 is provided with a plurality of cutting blades 403 alternatively with spacers 404 in the shaft direction of a driving shaft 401 and a driven shaft 402 so that the cutting blades 403 sandwich the spacer 404. These cutting blades 403 are disposed so that opposing cutting portions 405 thereof are overlapped with a small clearance (e.g., approximately 0.5 mm-1 mm). The cutting portions 405 that are provided in the peripheral of the cutting blade 403 are configured to crush a shredable object 420 by a shearing action between the opposing cutting blades 403 that draw the shredable object 420 therein. 408 represents a driver that drives both the shafts 401 and 402 through a gear mechanism 409.

Scrapers 407 are provided on the side of the shredder main body 406 with respect to the cutting blades 403, to scrape the shredable object 420 adhered on the cutting blades 403. The scraper 407 is formed in a shape so that it enters into a space between the cutting blade 403 and the spacer 404.

Shredding of the shredable object by this shredding machine 400 is carried out as throwing the shredable object 420 into an upper portion of the shredder main body 406, and discharging the shredable object 420 that is crushed by the cutting blades 403 from a lower portion.

[Patent Document #1] Japanese Unexamined Patent Publication No. HEI 8-323232

DISCLOSURE OF THE INVENTION

Object to be Solved by the Invention

However, with the configuration in which the shredable object 420 is thrown into the upper portion of the shredder main body 406 and the crushed shredable object 420 is discharged directly from the lower portion, as described above, the shredable object 420 may be discharged with a long length (depending on the shredable object) because the shredable object 420 is discharged after passing through between the cutting blades 403 only once.

As methods of making the shredable object 420 that is discharged with a long length into a small granular diameter, disposing the shredding machines in tandem as a plurality of stages, or installing another fine crusher as a later stage may be considered. However, in these cases, it is actually difficult in many cases since it is accompanied by a great increase in equipment expenses and increase in an installation space.

In addition, the shredable object 420 that is crushed by such a shredding machine includes various and miscellaneous objects. For example, if the shredable object is waste plastic or mattress, the shredable object may be mixed with foreign objects, such as metal, etc. Such a foreign object must be removed when recycling the crushed shredable object.

Besides, for example, a soft shredable object 420 may wind around the cutting blades 403 while being crushed, and a shredable object 420 that is formed by compression molding may deposit to the cutting portions 405 of the cutting blades 403.

The present invention addresses the above conditions, and provides a shredding machine capable of finely shredding a shredable object without being accompanied by a great increase in equipment expense and an increase in an installation space.

Means for Solving the Object

In order to achieve the objective, the shredding machine of the present invention is a shredding machine for finely shredding a shredable object, comprising a plurality of rotational shafts provided in parallel so as to support cutting blades in the transverse direction inside a shredder main body, wherein the cutting blade is provided with a plurality of cutting portions protruding from the peripheral of the cutting blade, and the cutting blades are disposed in the shaft direction of the plurality of the rotational shafts so that the cutting portions engage with each other, a throw-in port for the shredable object provided in an upper portion of the shredder main body, a discharge port for the shredable object provided in a lower portion of the shredder main body, wherein in order to finely crush the shredable object thrown into the throw-in port, inside the shredder main body, the discharge port is disposed so as to be offset in the shaft direction of the rotational shafts with respect to the throw-in port so that the shredable object is scraped up from the lower portion to the upper portion while being traversed from a throw-in port side to a discharge port side, to crush the shredable object for a plurality of times. Thus, the shredable object thrown into the throw-in port can be finely crushed by shredding the shredable object for the plurality of times while traversing the shredable object inside the shredder main body.

Moreover, in this shredding machine, predetermined perforations may be formed in the shredder main body below the throw-in port. Thus, a small shredable object can be removed below the throw-in port, and the remainder can be traversed to be crushed for a plurality of times.

Furthermore, in these shredding machines, a spiral traversing members may be provided in an inner wall of the shredder main body so that it traverses the shredable object from the throw-in port side to the discharge port side, while forwarding the shredable object from the lower portion on the throw-in port side toward the upper portion on the discharge port side. Thus, the shredable object can be stably forwarded to the upper portion on the discharge port side along this traversing member and repeatedly crushed.

Moreover, in this shredding machine, the spiral traversing member may be configured to be a spirally protruded member for traversing that is provided on the inner wall of the shredder main body, up to approximately an upper end position of the cutting blade. Thus, the shredable object can be scraped up to the upper end position of the cutting blade by the spirally protruded member.

Furthermore, in any one of these shredding machines, in order to traverse the shredable object from the throw-in port side to the discharge port side, a scrape-up member that protrudes from a tip-end of the cutting blade may be provided so as to rotate with the cutting blade, and scrape up its shredable object from the lower portion on the throw-in port side toward the upper portion on the discharge port side. Thus, the shredable object can be scraped up to the cutting blade upper portion on the discharge port side, more certainly.

Moreover, in this shredding machine, the scrape-up member may be formed with an incline-surfaced cutting portion for scraping up the shredable object by a front surface thereof in the rotational direction, and for traversing the shredable object toward the discharge port side. Thus, the shredable object can be forwarded to the discharge port side while being scraped up by the cutting portion for scraping up.

Furthermore, in the above mentioned shredding machine, the shredder main body may be configured to be tilted by arranging that the throw-in port side of the shredder main body is higher than the discharge port side so that it traverses the shredable object from the throw-in port side to the discharge port side using the tilt thereof.

Moreover, in this shredding machine, the tilt angle of the shredder main body may be configured to be variable by providing a driver for raising and lowering the throw-in port side or the discharge port side of the shredder main body. Thus, the shredder main body can be easily tilted to a desirable angle in which an efficient crush can be performed according to crush conditions.

In these shredding machines, the shredding machine may be for finely shredding a soft waste plastic as the shredable object, and wherein the shredder main body may be configured to tilt by approximately 8 degrees so that it crushes the soft waste plastic thrown into the throw-in port for a plurality of times by traversing the soft waste plastic toward the discharge port side while scraping up the soft waste plastic from the lower portion to the upper portion of the shredder main body. Thus, the soft waste plastic can be efficiently crushed.

Furthermore, in any one of these shredding machines, the cutting blades may be configured to be thinner on the discharge port side than on the throw-in port side so that a crush size of the shredable object is finer on the discharge port side.

The thickness of the cutting blades between the throw-in port side and the discharge port side may be configured to be thinner in a stepwise fashion from the throw-in port side. This stepped thinning configuration may include a configuration in which the cutting blades formed in the shaft direction of the rotational shafts are gradually thinner at every a plurality of cutting blades from the throw-in port side, and a configuration in which the cutting blades are gradually thinner at every cutting blade.

Moreover, in any one of these shredding machines, the number of the cutting portions of the cutting blade on the discharge port side may be configured to be more than the number of the cutting portions of the cutting blade on the throw-in port side so that a crush size of the shredable object is finer on the discharge port.

Furthermore, in any one of these shredding machines, the cutting blades may be arranged so that the cutting portions are arranged in a spiral to traverse the shredable object from the throw-in port side to the discharge port side, by rotating. Thus, the shredable object can be forwarded to the discharge port side by the rotating cutting blades.

In addition, in the above mentioned shredding machine, a diameter of the cutting blades on the discharge port side may be smaller than a diameter of the cutting blades on the throw-in port side, and a thickness of the cutting blades on the discharge port side may be thinner than a thickness of the cutting blades on the throw-in port side so that a crush size is finer. Thus, a large shredable object can be crushed by the cutting blades of the larger diameter on the throw-in port side, and the crushed shredable object can be crushed by the cutting blades of the smaller diameter while being forwarded to the discharge port side.

Furthermore, in the above mentioned shredding machine, a lower portion of the shredder main body may be configured to be of a damper gate type to open and close, and may be configured so that an amount of the shredable object being discharged from the damper gate is adjustable by adjusting an amount of opening and closing the damper gate. Thus, the whole quantity of the shredable object can be finely crushed by discharging the finely crushed shredable object from the damper gate, and traversing.

Moreover, in the above mentioned shredding machine, the discharge port provided in the lower portion of the shredder main body may include a plurality of discharge ports that are arranged between a position below the throw-in port in the shaft direction of the rotational shafts, each of the discharge ports may be provided with an open/close door, respectively, and wherein the plurality of open/close doors may be configured to be open and close. Thus, an amount of discharge of the shredable object can be adjusted by the degree of opening of the open/close door.

Furthermore, in this shredding machine, it may include a control device for adjusting a degree of opening of the open/close door according to a crush condition of the shredable object, or a power of the rotational shafts under load, or at a period of time. Thus, a discharge amount can be adjusted according to the crush condition.

Moreover, in the above mentioned shredding machine, the discharge port that is offset with respect to the throw-in port in the shaft direction of the rotational shafts, may be configured to be changeable to an arbitrary position between the offset position and the position below the throw-in port. Thus, the shredable object can be discharged according to the crush size.

Furthermore, in this shredding machine, a slide gate that is slidable in the shaft direction of the rotational shafts may be provided to the discharge port, and the discharge port may be configured to be formed in an arbitrary position by sliding the slide gate to open. Thus, the shredable object can also be discharged according to crush size.

Moreover, in the above mentioned shredding machine, a foreign object discharge port may be provided to the lower portion or side portions of the shredder main body so as to be able to open and close, to discharge a foreign object mixed in the shredable object out of the crusher. Thus, the foreign object that is thrown in and mixed in the shredable object can be discharged out of the crusher.

Furthermore, in this shredding machine, it may include a control device having a function to open the foreign object discharge port in the lower portion or the side portions of the shredder main body, when an operational state measured value of the crusher is changed as the foreign object is thrown in. Thus, the foreign object can be detected from the operational state of the crusher, and it can be discharges out of the crusher through a foreign object discharge port.

Moreover, in these shredding machines, a foreign object pocket into which the foreign object enters may be provided to the lower portion of the shredder main body, and the foreign object discharge port from which the foreign object being entered into the foreign object pocket is discharged may be provided so as to open and close. Thus, a heavy foreign object can enter into the foreign object pocket provided in the lower portion of the shredder main body, and can be discharged.

Furthermore, in this shredding machine, a foreign object pocket into which the foreign object enters may be provided to the lower portion of the shredder main body, and a foreign object discharge damper may be provided to the foreign object pocket, and wherein an amount of opening and closing the foreign object discharge damper is configured to be controllable by the control device. Thus, the heavy foreign object can enter into the foreign object pocket provided in the lower portion of the shredder main body, and can be discharged.

Moreover, in the above mentioned shredding machine, a foreign object pocket into which the foreign object enters may be provided to the lower portion of the shredder main body, and a foreign object pusher that extends in the foreign object pocket from the throw-in port side to the discharge port side may be provided so that the foreign object that enters into the foreign object pocket is discharged from the discharge port by the foreign object pusher. Thus, the heavy foreign object can also be enter into the foreign object pocket provided in the lower portion of the shredder main body, and can be discharged.

Furthermore, in the above mentioned shredding machine, the foreign object discharge port may be constituted by a foreign object discharge slide gate that is slidable in the shaft direction of the shredder main body, and may be configured so that the lower portion of the foreign object pocket is openable by sliding the foreign object discharge slide gate. Thus, the heavy foreign object can also be enter into the foreign object pocket provided in the lower portion of the shredder main body, and can be discharged.

Moreover, in the above mentioned shredding machine, the foreign object discharge port may be constituted by a foreign object discharge side damper for opening a side portion of the shredder main body, and the foreign object discharge side damper may be configured to be openable so that the foreign object on an upper portion of the cutting blade is discharged outside the shredder main body. Thus, the foreign object that is mixed with the shredable object and is thrown in can be discharged out of the crusher from the side portion of the shredder main body. Thereby, a large foreign object that does not fall down to the lower portion of the cutting blade can also be discharged.

Furthermore, in the above mentioned shredding machine, the throw-in port may be provided in a central portion of the shredder main body in the shaft direction of the rotational shafts, the discharge ports may be provided in both end portions of the shredder main body in the shaft direction of the rotational shafts, and the crusher may be configured so that it crushes the shredable object thrown into the throw-in port for a plurality of times while it traverses the shredable object from the throw-in port side to both the discharge port sides and scrapes up the shredable object from the lower portion to the upper portion. Thus, since the shredable object is crushed while being forwarded toward the both ends from the central portion, a throughput can be doubled.

Moreover, in any one of these shredding machines, it may include a driver for independently driving each of the plurality of rotational shafts; and a control device for making the driver independently rotate the plurality of rotational shafts at different rotational speeds. Thus, even if the shredable object forwarded in the transverse direction inside the shredder main body winds around the cutting blade, the shredable object wound around can be removed from the cutting blade by changing the speed of the rotational shaft.

Furthermore, in this shredding machine, the control device may include a function to drive the plurality of rotational shafts so as to interchange a high speed and a low speed at a predetermined interval. Thus, the shredable object wound around can be removed more certainly, by interchanging the speed difference of the rotational shafts.

Moreover, in the above mentioned shredding machine, the control device may include a function to selectively perform one of drives of the plurality of rotational shafts among a normal rotation at the same rotational speed, a normal rotation of one rotational shaft at a low speed, and a reverse rotation of one rotational shaft at the low speed. Thus, the rotational direction can be desirable according to the crush conditions.

On the other hand, the shredding method of the present invention may include shredding a shredable object thrown into an upper body portion of a crusher at one end portion of the crusher in a shaft direction of rotational shafts that are disposed in parallel in the shaft direction of the rotational shafts, by cutting blades that engage with each other, traversing the shredable object toward the other end portion in the shaft direction of the rotational shafts while shredding the crushed shredable object for a plurality of times by the cutting blades; and discharging the crushed shredable object from the other end portion in the shaft direction of the rotational shafts. Also by this, the shredable object thrown into the throw-in port can be finely crushed inside the shredder main body for a plurality of times, while being traversed.

Moreover, in this shredding method, the shredable object that is smaller than a predetermined perforation among the shredable objects, and the shredable object that is crushed first by the cutting blades and becomes smaller than the predetermined perforation may be discharged at a position below the throw-in port; and wherein the shredable object that is larger than the predetermined perforation may be crushed for a plurality of times by the cutting blades while being traversed toward the other end portion in the shaft direction of the rotational shafts.

Furthermore, in these shredding methods, the crushed shredable object may be re-crushed between the cutting blades while being scraped up from the lower portion on the throw-in port side to the upper portion on the discharge port side.

Effect of the Invention

By the means explained above, since the present invention is capable of shredding the shredable object to be shredded by the cutting blades for a plurality of times inside the shredder main body, it is possible to finely crush the shredable object.

DESCRIPTIONS OF REFERENCE NUMERALS

Figure 1:
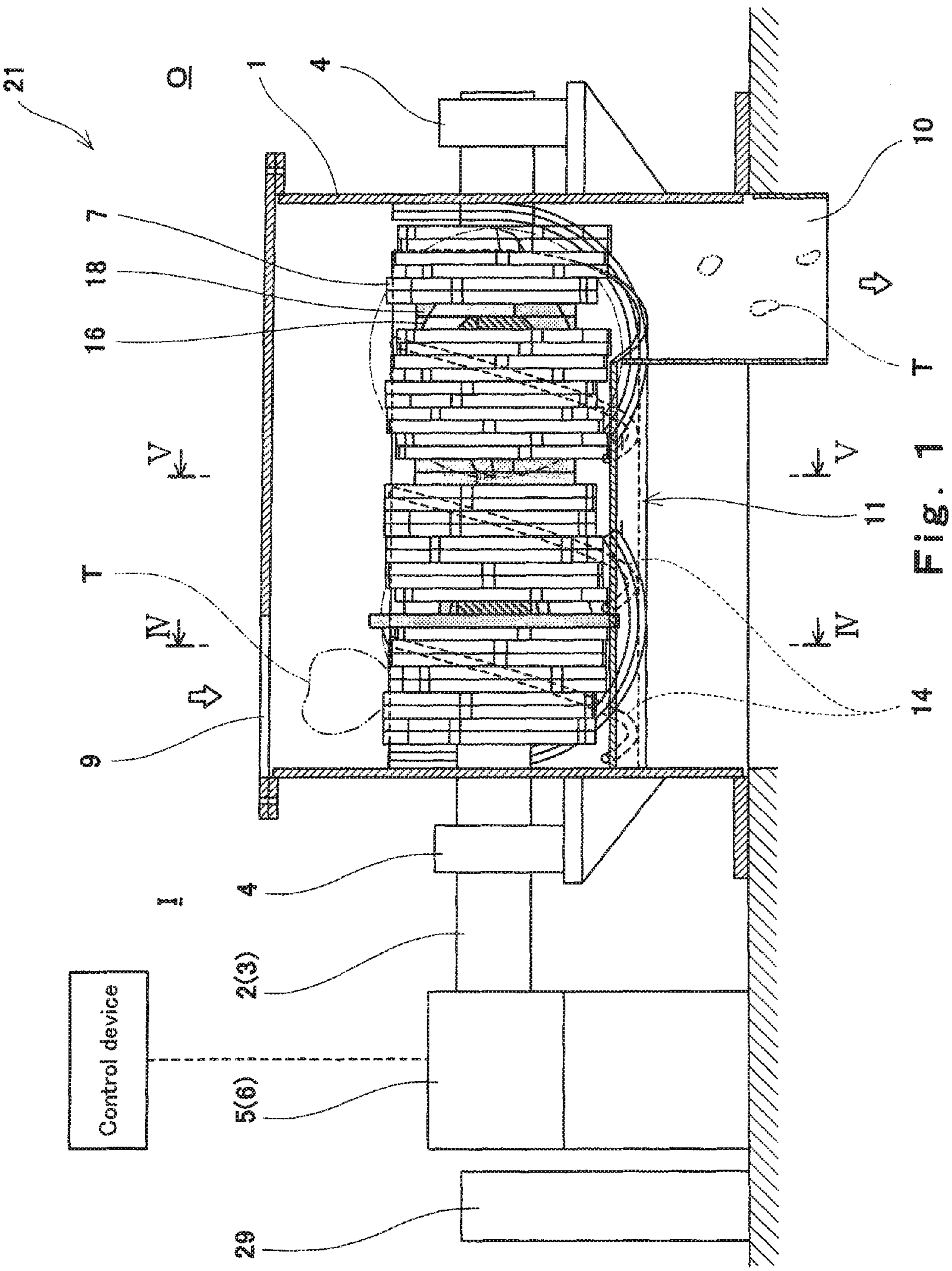
FIG. 1 is a longitudinal cross-sectional view of a shredding machine showing a 1st Embodiment of the present invention.

1 Shredder Main Body
2, 3 Rotational Shaft
4 Bearing
5, 6 Driver
7 Cutting Blade
8 Spacer
9 Throw-in Port
10 Discharge Port
11 Lower Case
14 Traversing Member
15 Perforation
16 Scrape-up Member
17 Pawl Portion
18 Spacer
19 Inclined Surface
20 Cutting Portion
21 Shredding Machine
31 Shredder Main Body
32, 33 Rotational Shaft
34 Bearing
35, 36 Driver
37A Cutting Blade
37B Cutting Blade
38 Spacer
39 Throw-in Port
40 Discharge Port
41 Lower Case
44 Traversing Member
46 Scrape-up Member
51 Shredding Machine
61 Shredder Main Body
62, 63 Rotational Shaft
67A Cutting Blade
67B Cutting Blade
68 Spacer
69 Throw-in Port
70 Discharge Port
74 Traversing Member
81 Shredding Machine
82 Discharge Pocket
83 Open/Close Door
91 Shredder Main Body
92, 93 Rotational Shaft
97A Cutting Blade
97B Cutting Blade
98 Spacer
99 Throw-in Port
100 Discharge Port
104 Traversing Member
111 Shredding Machine
112 Discharge Pocket
113 Slide Gate
114 Slide Jack
121 Shredder Main Body

122, 123 Rotational Shaft
127A Cutting Blade
127B Cutting Blade
128 Spacer
129 Throw-in Port
130 Discharge Port
134 Traversing Member
141 Shredding Machine
142 Foreign Object Pocket
143 Foreign Object Discharge Damper
151 Shredder Main Body
152, 153 Rotational Shaft
157A A Cutting Blade
157B Cutting Blade
158 Spacer
159 Throw-in Port
160 Discharge Port
164 Traversing Member
171 Shredding Machine
172 Foreign Object Pocket
173 Foreign Object Discharge Damper
174 Jack
175 Foreign Object Discharge Chute
181 Shredder Main Body
182, 183 Rotational Shaft
187A Cutting Blade
187B Cutting Blade
188 Spacer
189 Throw-in Port
190 Discharge Port
194 Traversing Member
201 Shredding Machine
202 Foreign Object Pocket
203 Foreign Object Pusher
204 Jack
211 Shredder Main Body
212, 213 Rotational Shaft
217A Cutting Blade
217B Cutting Blade
218 Spacer
219 Throw-in Port
220 Discharge Port
224 Traversing Member
231 Shredding Machine
232 Foreign Object Pocket
233 Foreign Object Discharge Slide Gate
234 Jack
235 Foreign Object Discharge Chute
241 Shredder Main Body
242, 243 Rotational Shaft
247A Cutting Blade
247B Cutting Blade
248 Spacer
249 Throw-in Port
250 Discharge Port
254 Traversing Member
261 Shredding Machine
262 Foreign Object Discharge Damper
263 Shaft
271 Shredder Main Body
272, 273 Rotational Shaft
277A Cutting Blade
277B Cutting Blade
278 Spacer
279 Throw-in Port
280 Discharge Port
284 Traversing Member
291 Shredding Machine
292 Discharge Pocket
293 Open/Close Door
300 Rear Supporting Portion
301 Front Supporting Portion
302 Supporting Shaft
303 Mount
304 Jack
305 Shredding Machine
S1-S4 Clearance
I Throw-in Port Side
O Discharge Port Side
E Foreign Object
T Shredable Object

BEST MODE TO IMPLEMENT THE INVENTION

Hereafter, one Embodiment of the present invention will be explained referring to drawings. In the following Embodiment, an example of twin-shaft shredding chine in which a throw-in port for a shredable object is provided in one end portion of an upper body portion of a crusher in the shaft direction of the rotational shafts, and a discharge port for the shredable object is provided in the other end portion of the rotational shaft of the lower body portion of the crusher in the shaft direction will be described.

1st Embodiment

Figure 2:
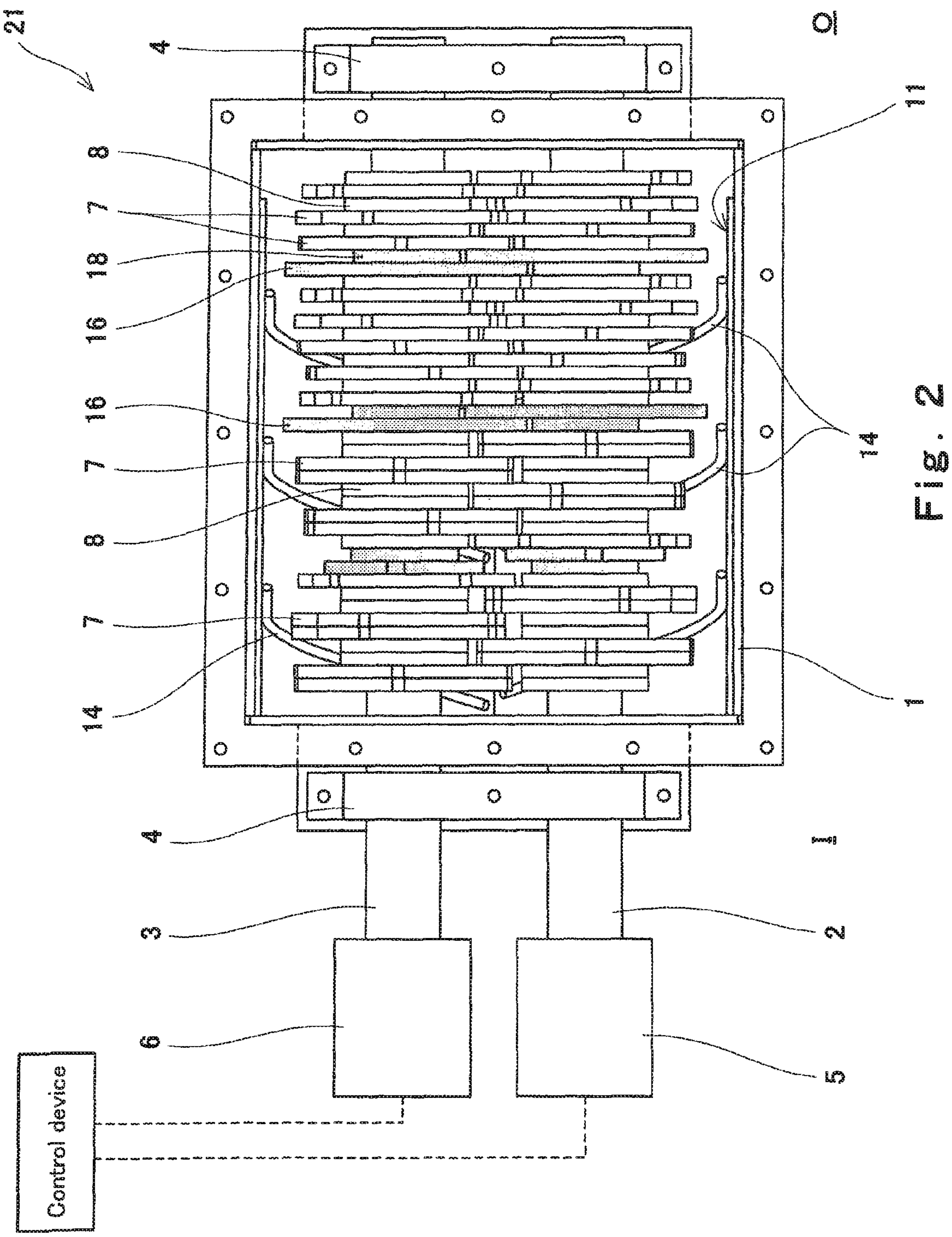
FIG. 2 is a plan view of the shredding machine shown in FIG. 1.
Figure 3:
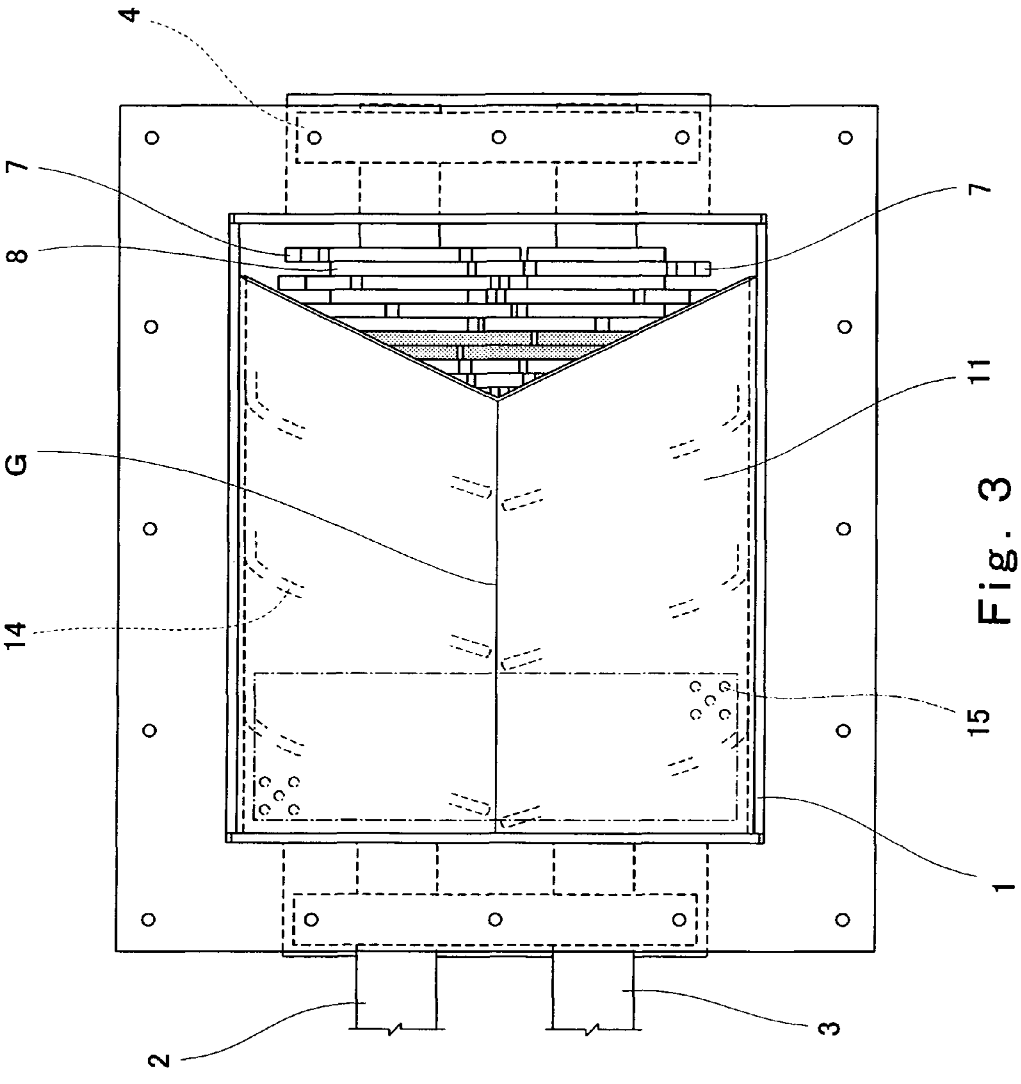
FIG. 3 is a bottom view of the shredding machine shown in FIG. 1.
Figure 4:
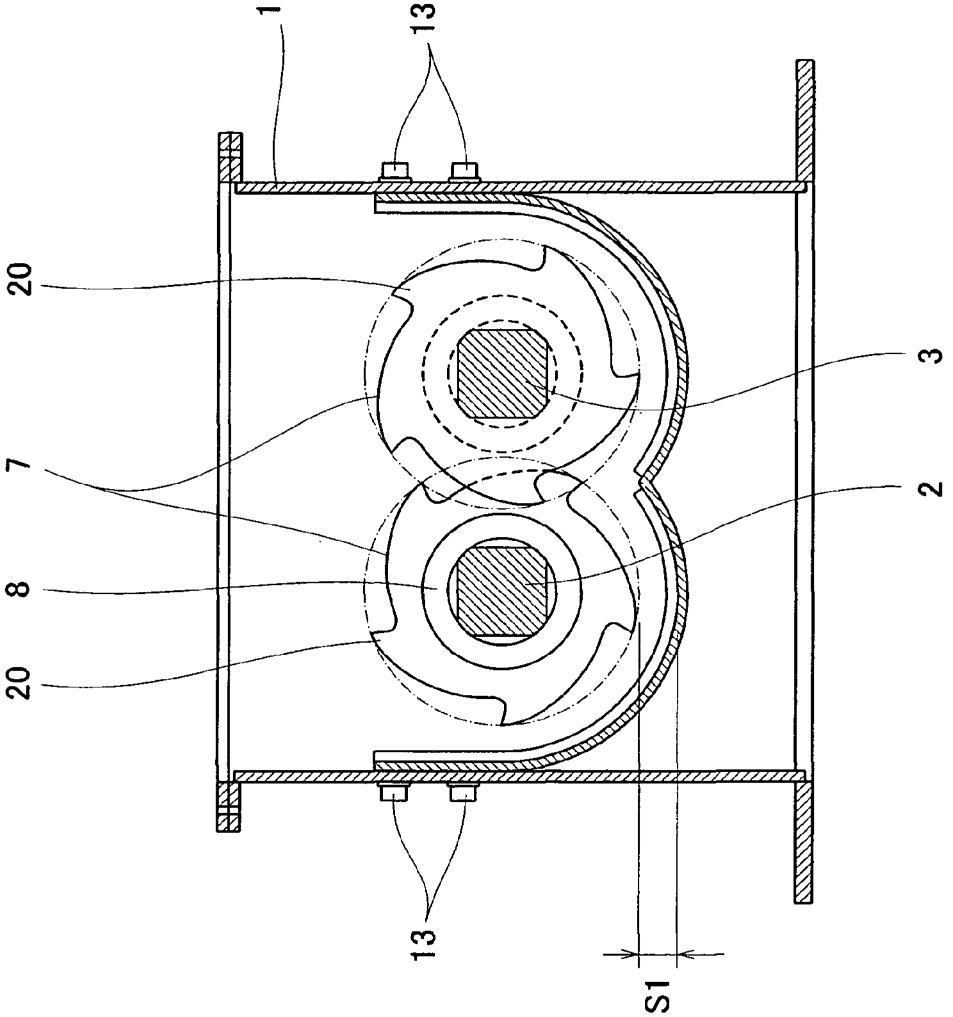
FIG. 4 is a cross-sectional view of the shredding machine, taken along a line IV-IV of FIG. 1.
Figure 5:
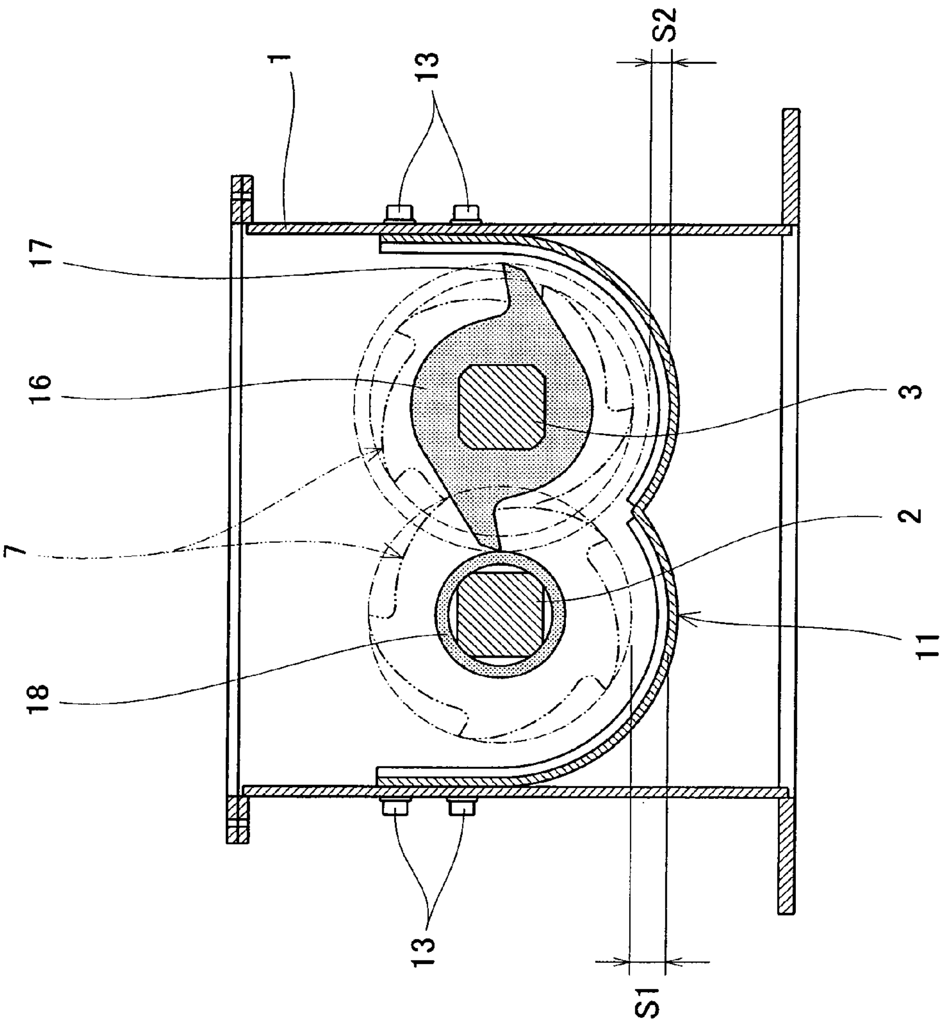
FIG. 5 is a cross-sectional view of the shredding machine, taken along a line V-V of FIG. 1.
Figure 6:
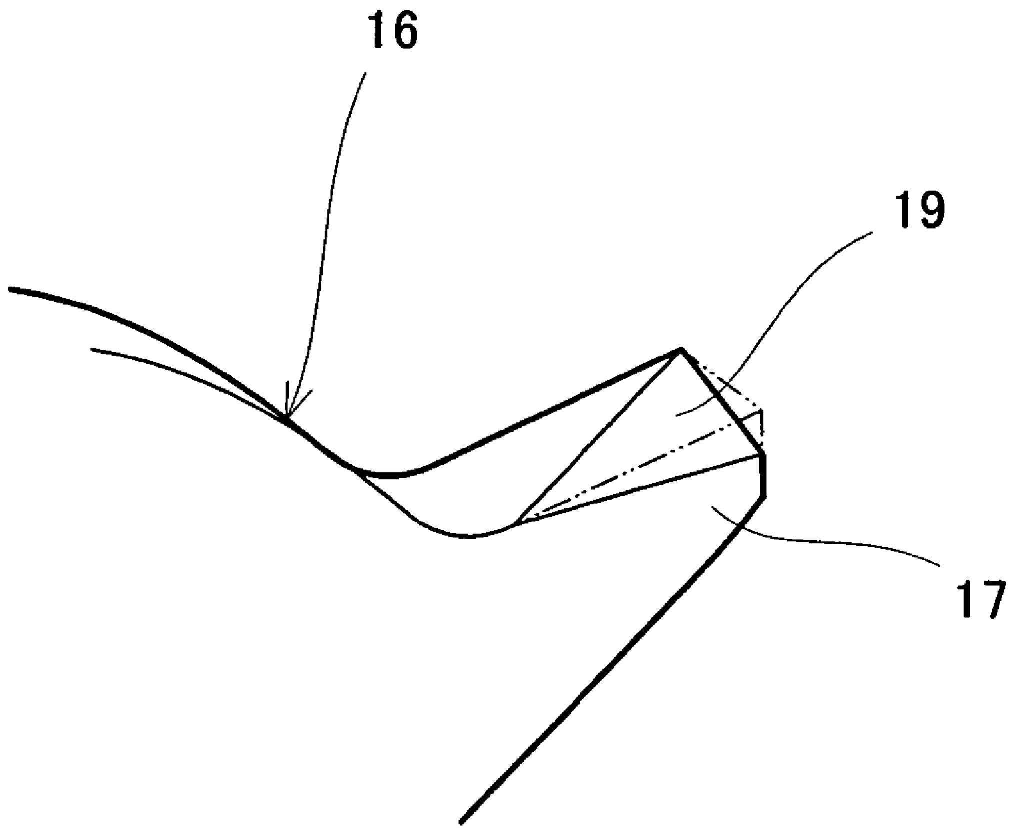
FIG. 6 is a perspective view showing a tip-end portion of a scrape-up member of FIG. 5.
Figure 7:
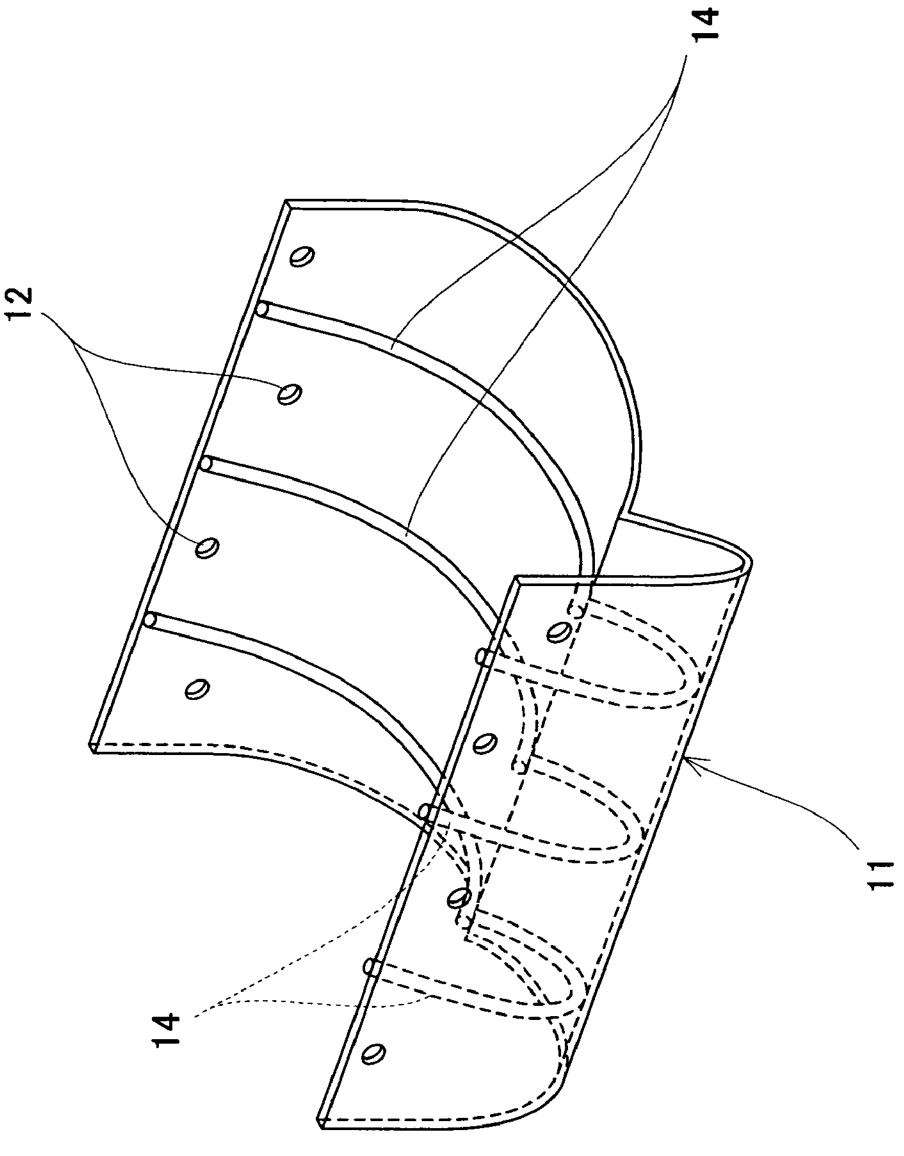
FIG. 7 is a perspective view showing a lower case of FIG. 3.

FIG. 1 is a longitudinal cross-sectional view of the shredding machine showing 1st Embodiment of the present invention, FIG. 2 is a plan view of the shredding machine, FIG. 3 is a bottom view of the shredding machine, FIG. 4 is a IV-IV cross-sectional view of the shredding machine, and FIG. 5 is a V-V cross-sectional view of the shredding machine. FIG. 6 is a perspective view showing a tip-end portion of a scrape-up member shown in FIG. 5, and FIG. 7 is a perspective view of a lower case shown in FIG. 3.

As shown in FIGS. 1 and 2, in the shredder main body 1, two rotational shafts 2 and 3 are disposed in parallel. These rotational shafts 2 and 3 are rotatably supported by bearings 4. 5 and 6 are drivers, and they are configured to directly drive both the shafts 2 and 3.

In the shaft direction of these rotational shafts 2 and 3, cutting blades 7 and spacers 8 are alternatively provided so that the cutting blades 7 sandwich the spacer 8. The cutting blades 7 formed on both the rotational shafts 2 and 3 are disposed so that cutting portions 20 (FIG. 4) provided on the outer peripheral of these cutting blades 7 engage with each other. In a position where both the rotational shafts 2 and 3 are opposed, the cutting blade 7 and the spacer 8 face each other. Thereby, the cutting blades 7 formed on both the shafts 2 and 3 are overlapped in a state in which side faces thereof have a small gap (for example, approximately 0.5 mm-1 mm) therebetween. It is configured so that the shredable object T is crushed in the central portion by inwardly rotating the cutting blades 7 that are provided on these rotational shafts 2 and 3. 29 is a control device of the crusher.

Moreover, as shown in FIG. 1, the shredder main body 1 in this Embodiment is provided with a throw-in port 9 in an upper left section of the figure, and a discharge port 10 in a lower right section. A lower case 11 is provided between a lower portion of the throw-in port 9 and the discharge port 10. Thereby, it is configured so that the shredable object T thrown into the throw-in port 9 is forwarded in the shaft direction on the lower case 11, and discharged from the discharge port 10.

Furthermore, in this Embodiment, as shown in FIG. 2, the cutting blades 7 on the throw-in port side are doubled in thickness by piling up two cutting blades 7, and the cutting blades 7 on the discharge port side are made to be single thickness. Thereby, it is configured so that the shredable object T is shredded into long pieces (double thickness in this example) with the thick cutting blade 7 on the throw-in port side I, and the shredable object T is shredded into short pieces (single thickness in this example) on the discharge port side O, to be finely crushed. In addition, by making the thickness of the cutting blades 7 thicker on the throw-in port side, it is possible to prevent breakage of the cutting blades 7 caused by excessive load when an unsuitable object to be crushed (foreign object) etc. is mixed.

Although the thickness of the cutting blades on the throw-in port side is thickened by piling up the cutting blades 7 of the same thickness in this Embodiment, a thick cutting blade may be formed in one piece. A difference between the thickness of the cutting blades on the throw-in port side and the discharge port side O is not limited to this Embodiment.

In addition, in this Embodiment, the cutting portions 20 provided at the tip-ends of the cutting blade 7 are arranged to be phase-shifted in the circumferential direction as shown in FIG. 2 so that the shredable object T is forwarded in the shaft direction of the rotational shafts from the throw-in port side I toward the discharge port side O, as shown in FIG. 4. That is, the cutting portions 20 provided at the tip-ends of the cutting blades 7 that rotates inwardly are arranged to be shifted in the position so that they draw spiral circles from the throw-in port side I toward the discharge port side O. Thereby, the shredable object T crushed by these cutting blades 7 is forwarded to the discharge port side O by the rotation of the cutting portions 20.

As shown in FIGS. 4 and 7, a lower portion of the lower case 11 is formed in an arc shape such that a predetermined gap S1 is provided between a circle defined by the rotation of the cutting blades 7. Since this Embodiment is a twin-shaft shredding machine, the lower portion of the lower case 11 is formed in a shape of two arcs next to each other. Both the side portions of this lower case 11 are formed with perpendicular portions for being fixed to the shredder main body 1. This perpendicular portion is fixed to the shredder main body 1 with bolts 13 in holes 12.

In this Embodiment, with the shape of the lower case 11 and the shape of the shredder main body 1, it is configured to enable the shredding of the shredable object T repeatedly for a plurality of times inside the shredder main body 1. That is, it is configured so that the shredable object T is scraped up from a lower portion to an upper portion and repeatedly crushed, by constituting an inner wall so that the shredable object T stagnates in the lower portion of the shredder main body 1, and forming the inner wall to follow side portions of the cutting blades 7 from lower portions of the cutting blades 7.

This inner wall to enable the scraping-up of the shredable object T from the lower portion to the upper portion may be formed such that the shape of the lower portion is cylindrical, square, or the above-mentioned concentric circular shape by the cutting blades 7, etc., in a side view, and such that the shape of the side portions are vertically linear, or curved in concentric circles with the cutting blade 7, etc. Moreover, the lower case 11 may be formed in one piece with the shredder main body 1 as will be mentioned hereinafter.

Furthermore, in an inner surface of this lower case 11, traversing members 14 are provided in each of the two arcuate inner surfaces so as to be arranged from the central portion toward the upper portion of the side faces of the cutting blades 7. The upper end of this traversing member 14 is provided up to approximately an upper end position of the cutting blade 7. As shown in FIG. 7, this traversing member 14 is a round bar of a predetermined diameter. This traversing member 14 is provided aslant so that it forms in a loose spiral from the central portion toward the discharge port side of the lower case 11 in each of the two arcuate inner surfaces of the lower case 11.

Moreover, as shown in FIG. 3, the discharge port 10 provided on the discharge port side O of this lower case 11 is formed in approximately a triangular shape in which both ends spread from the central portion. By forming this discharge port 10 in approximately a triangular shape, it is easier to scrape up the shredable object T, which is crushed by the cutting blades 7 and fell on the lower case, to the upper portions of the cutting blades 7 by the traversing member 14.

Furthermore, as shown by two-dot chain lines in FIG. 3, predetermined perforated perforations 15 in a position of the lower case 11 below the throw-in port may be formed. This perforations 15 may be formed in a perforation size so as to be able to discharge a small object in the shredable object T thrown into the throw-in port 9, or an object which is finely crushed by the cutting blades 7. By forming such perforations 15, it may be possible to discharge the shredable object T crushed into a predetermined size by one crush to outside the crusher without carrying out re-shredding. Thereby, a quantity of the shredable object T being traversed and crushed for a plurality of times inside the shredder main body can be reduced, and processing efficiency can be improved.

In the meantime, the lower case 11 in this Embodiment may be replaced with of a damper-gate type in which a central connecting portion of the two arcuate shapes (a line G in the shaft direction shown in FIG. 3) opens and closes to the left and right downwardly so that it can adjust crush size by narrowing an exit of this lower case 11.

Furthermore, as shown in FIG. 2, since the cutting blades 7 provided on the rotational shafts 2 and 3 are phase-shifted in the shaft direction, in order to correspond to the arrangement of the cutting blades 7, the traversing members 14 on the upper side of the figure are provided from the closest to the throw-in port, and the traversing members 14 on lower side of the figure are provided from an offset position toward the discharge port side by approximately the thickness of the cutting blade.

Moreover, at predetermined positions of the cutting blades 7 provided on both the rotational shafts 2 and 3 in the shaft direction, scrape-up members 16 are provided to scrape up the crushed shredable object T to the upper portions of the cutting blades 7 along the inner wall of the shredder main body 1.

As shown in FIG. 5, this scrape-up member 16 is a member that is provided with claw portions 17 at the tip-ends. The claw portions 17 define a larger circle than the circle defined by the blade edges of the cutting blades 7. A gap S2 between this tip-end of the scrape-up member 16 and the lower case 11 is narrower than a gap S1 between the cutting blade 7 and the lower case 11. In this Embodiment, two claw portions 17 are provided so as to be opposed. The scrape-up members 16 are provided at three places in the shaft direction, as shown in FIG. 1. At opposed positions where the scrape-up members 16 are provided, spacers 18 with a smaller diameter are provided (FIG. 5).

Furthermore, as shown in FIG. 2, in this Embodiment, since three rows of the traversing members 14 described above are provided in the shaft direction of the rotational shafts, the scrape-up members 16 are provided between these traversing members 14. In this way, by providing the scrape-up members 16 at a position the traversing members 14 discontinue, it is easy to forward the shredable object T scraped up along the inner wall of the shredder main body 1 by the scrape-up members 16, to the discharge port side along the traversing member 14.

In addition, as shown in FIG. 6, in this Embodiment, the claw portion 17 of this scrape-up member 16 is formed in an inclined surface 19 so that it forwards the shredable object T to the discharge port side O while it scrapes up the shredable object T. As this inclined surface 19, it may be in another shape such that it can act a force in the transverse direction when scraping up the shredable object T from the lower case 11.

On the other hand, as shown in FIG. 4, in this Embodiment, all the cutting blades 7 are formed with five blades in which the cutting portions 20 are formed at five positions in the circumferential direction. This cutting portion 20 may coarsely crush on the throw-in port side I and finely crush on the discharge port side O, by having less number of the cutting portions 20 of the cutting blade 7 on the throw-in port side I, and more number of the cutting portions 20 of the cutting blade 7 on the discharge port side O. By configuring as such, even if the shredable object T is hard such as compressed resin, it can be gradually crushed by less number of the cutting portions 20 on the throw-in port side I, and can be crushed down to a predetermined size by shredding for a plurality of times, by the time the crushed shredable object T is forwarded to the discharge port 10 and discharged.

According to the shredding machine 21 of 1st Embodiment configured as described above, the shredable object T can be coarsely crushed by the thick cutting blades 7 on the throw-in port side I. The crushed shredable object T can be forwarded to the discharge port side O by the traversing members 14 while being scraped up by the scrape-up member 16 to the upper portions of the cutting blades 7, and it can be finely crushed by the thin cutting blades 7 on the discharge port side O. Also, in this Embodiment, since three sets of the traversing members 14 and the scrape-up members 16 are provided, the shredable object T can be crushed approximately at least three times, and can be finely crushed.

In addition, the number of times of crush may be easily changed by changing the set number of the traversing members 14 and the scrape-up member 16.

2nd Embodiment

Figure 8:
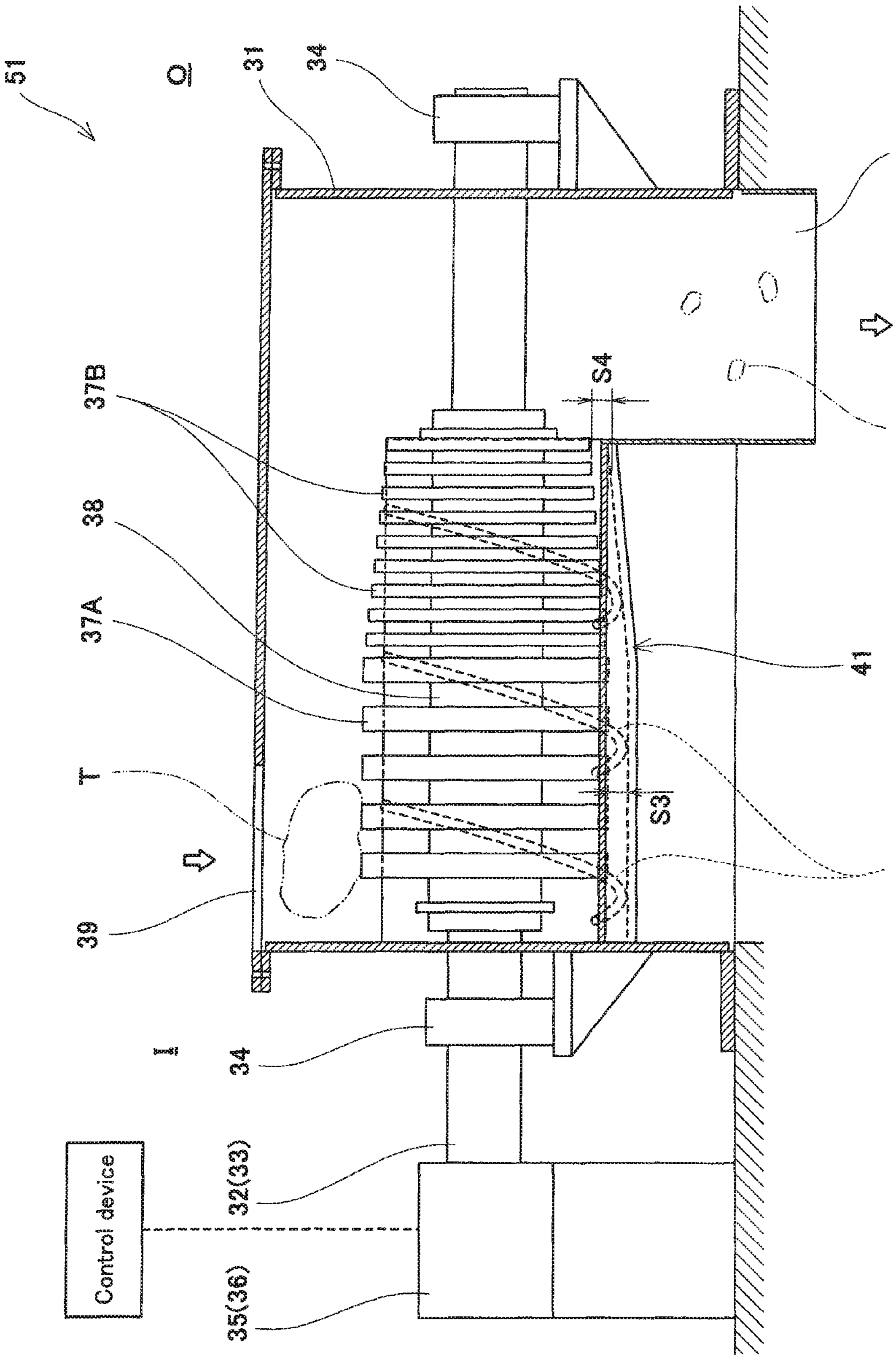
FIG. 8 is a longitudinal cross-sectional view of a shredding machine of 2nd Embodiment of the present invention.
Figure 9:
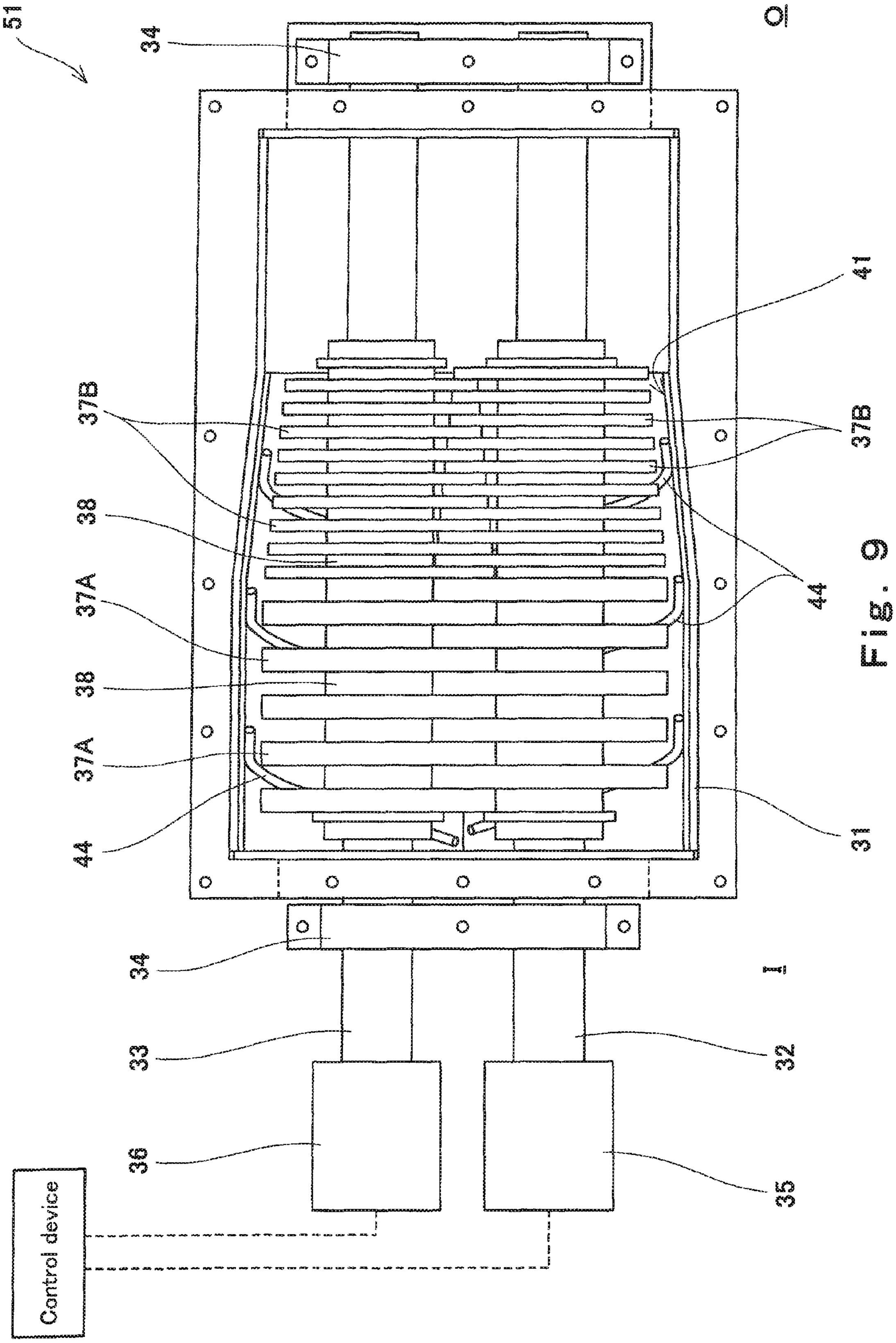
FIG. 9 is a plan view of the shredding machine shown in FIG. 8.

FIG. 8 is a longitudinal cross-sectional view of a shredding machine showing 2nd Embodiment of the present invention, and FIG. 9 is a plan view of the shredding machine. In this 2nd Embodiment, a twin-shaft shredding machine will also be explained as an example of the shredding machine.

As illustrated, two rotational shafts 32 and 33 are disposed in parallel inside a shredder main body 31. These rotational shafts 32 and 33 are rotatably supported by bearings 34. 35 and 36 are drivers to directly drive both the shafts 32 and 33. Cutting blades 37 and spacers 38 are alternatively provided in the shaft direction of the rotational shafts 32 and 33 so that the cutting blades 37 sandwich the spacer 38. Since the cutting blades 37 formed on these rotational shafts 32 and 33 are configured so as to be similar to the above-mentioned 1st Embodiment, the detailed explanation thereof will be omitted. Moreover, the same configuration as the above-mentioned 1st Embodiment will be explained by adding 30 to the reference numerals.

Further, in this 2nd Embodiment, as illustrated, the cutting blades 37A on a throw-in port side 39 are formed in a larger diameter, and the cutting blades 37B on a discharge port side 40 are formed in a smaller diameter. Thereby, it is configured so that the diameter of the cutting blades 37B are smaller toward the discharge port side O from the throw-in port sides I. The cutting blades 37A of the larger diameter are formed to be thicker and the same diameter altogether. The cutting blades 37B of the small diameter are formed to be thinner and have a gradually smaller diameter toward the discharge port side O.

In the meantime, the lower case 41 of the shredder main body 31 is configured so that an inner wall thereof is tapered to have a smaller diameter in which the inner wall is provided with a predetermined gap S3 between the cutting blades 37A of the larger diameter on the discharge port side O, and a predetermined gap S4 between the cutting blades 37B of the smaller diameter which diameter is gradually smaller on the throw-in port side I. A discharge port 40 is provided on this discharge port side O of the lower case 41 that is made to have a smaller diameter.

Moreover, an inner surface of the lower case 41 in this Embodiment is also provided with traversing members 44 from a central portion to the shredder main body 31 toward side walls. These traversing members 44 are also circular bars of a predetermined diameter, similar to 1st Embodiment as described above. This traversing member 44 is provided aslant so that it defines a loose spiral on each of the two-arcuate inner surfaces of the lower case 41 from the central portion of the lower case 41 toward the discharge port side O.

According to the shredding machine 51 of 2nd Embodiment configured as described above, a large shredable object T can be crushed by the cutting blades 37A of the larger diameter on the throw-in port side I, and the crushed shredable object T can be crushed by the cutting blades 37B of the smaller diameter, while being forwarded to the discharge port side O. In addition, since the thicker cutting blades 37A with larger diameter are provided on the throw-in port side I, even a larger aggregated shredable object T can be crushed. The crushed shredable object T is finely crushed by the thinner cutting blades 37B of the small diameter while being forwarded in the transverse direction toward the discharge port side O by the traversing members 44. Moreover, since there are fewer cutting blades 37A that carry out shred below the throw-in port 39, load is reduced at the time of beginning of the crush. In addition, since the action in which shredding of the shredable object T is repeated for a plurality of times inside the shredder main body 31 is the same as that of 1st Embodiment as described above, the detailed explanation thereof will be omitted.

3rd Embodiment

Next, an example in which a shredable object T can be finely crushed as described above and a crush size of finely shredding and discharging can be changed will be explained. In the following example, an example of the shredding machine in which the crush size of discharging from the shredding machine can be changed by making a discharge position of the shredable object T variable will be explained.

Figures 10A, 10B, 10C:
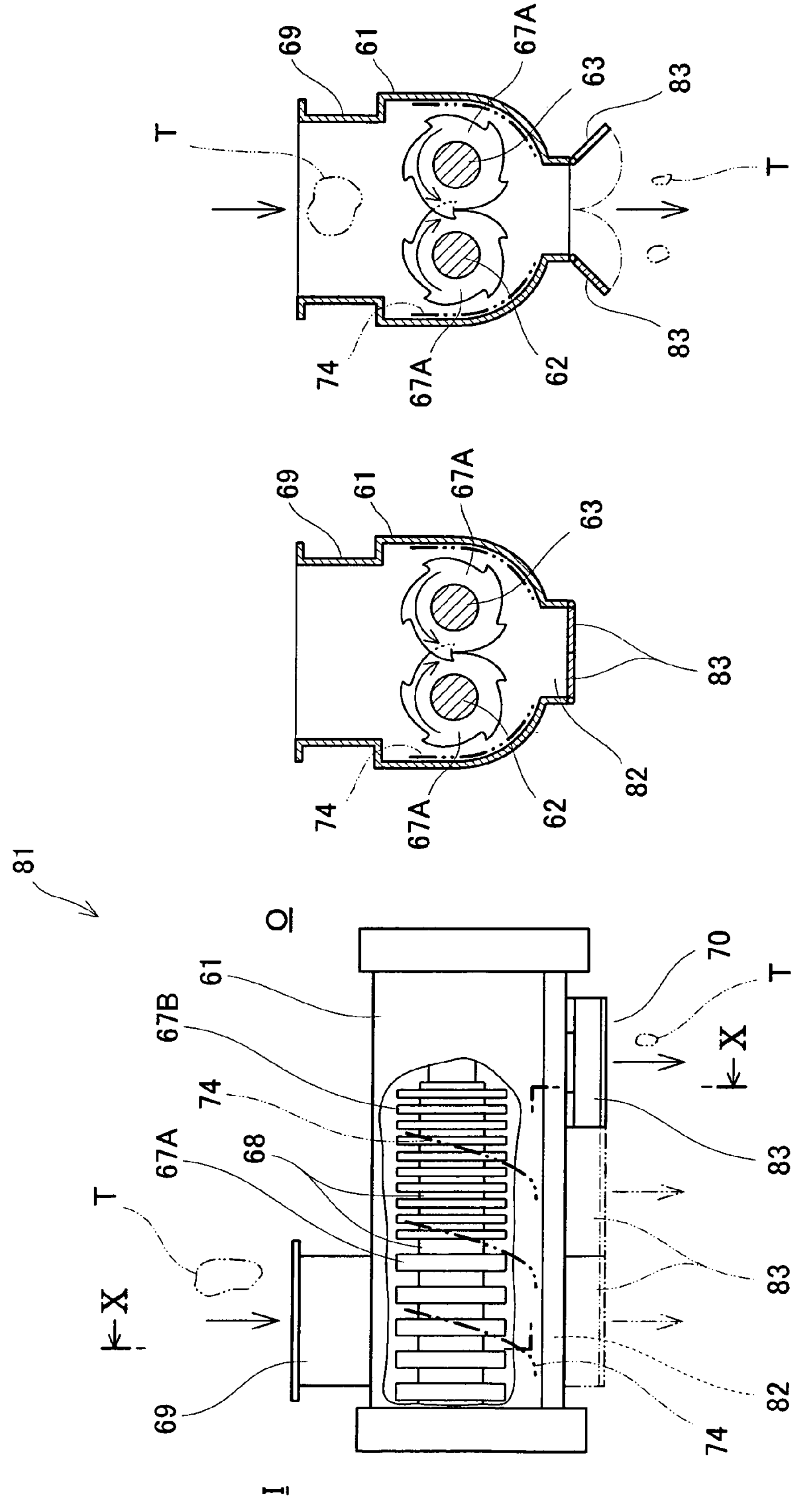
FIGS. 10(*a*)-(*c*) are drawings of a shredding machine showing 3rd Embodiment of the present invention, FIG. 10(*a*) is a partially cross-sectional side view, FIG. 10(*b*) is a longitudinal cross-sectional view, taken along a line X-X, at the time of closing an open/close door, and FIG. 10(*c*) is a longitudinal cross-sectional view at the time of opening the open/close door.
Figure 11A:
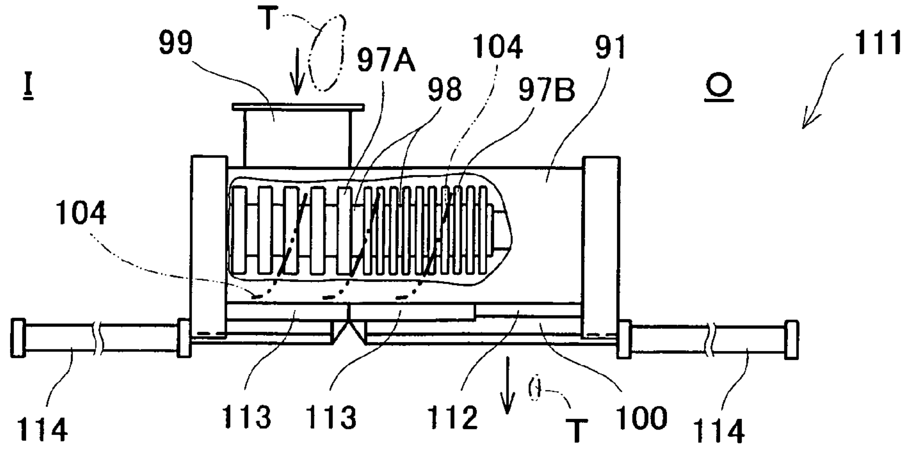
FIGS. 11(*a*)-(*d*) are drawings of a shredding machine showing 4th Embodiment of the present invention, FIG. 11(*a*) is a partially cross-sectional side view of an example in which a discharge port is provided in the furthest position from a throw-in port, FIG. 11(*b*) is a partially cross-sectional side view of an example in which the discharge port is provided between the furthest position and the closest position, FIG. 11(*c*) is a partially cross-sectional side view in which the discharge port is provided in the closest position to the throw-in port, and FIG. 11(*d*) is a longitudinal cross-sectional view of the throw-in port portion of FIG. 11(*a*).
Figure 11B:
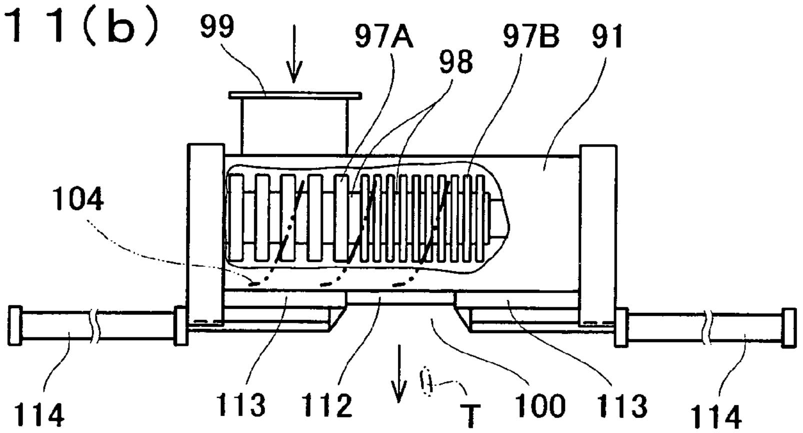
Figure 11C:
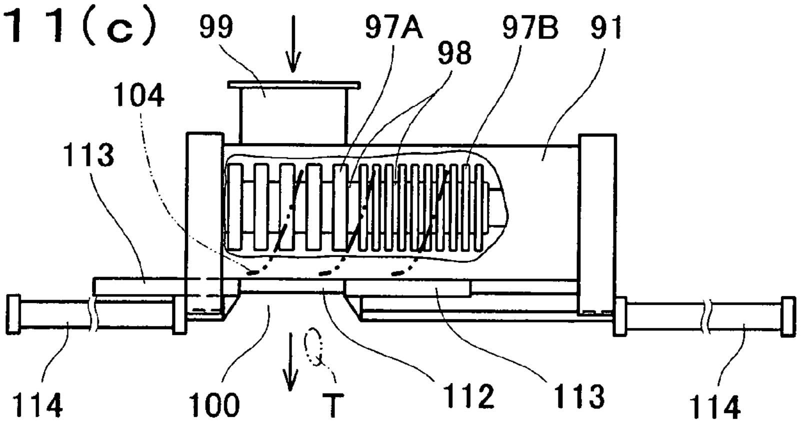
Figure 11D:
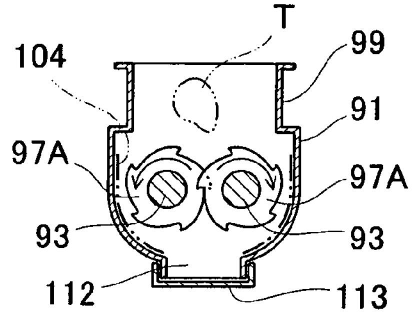

FIGS. 10(*a*)-(*c*) are figures of the shredding machine showing 3rd Embodiment of the present invention. FIG. 10(*a*) is a side view, partially cross-sectioned. FIG. 10(*b*) is a longitudinal cross-section taken along a line X-X, at the time of closing an open/close door. FIG. 10(*c*) is the longitudinal cross-section, at the time of opening the open/close door. This 3rd Embodiment is an example in which the crush size of the shredable object T to be discharged from the shredding machine can be chosen from three sizes. In addition, the same configuration as 1st Embodiment as described above is denoted by adding 60 to the reference numerals, and the detailed explanation thereof will be omitted. Moreover, in this 3rd Embodiment, a shredder main body is integrally formed with a lower case of 1st Embodiment as described above. Furthermore, in the figure, an illustration of scrape-up members is omitted.

As illustrated, two rotational shafts 62 and 63 are rotatably disposed in parallel in the shredder main body, similar to 1st and 2nd Embodiments described above. Cutting blades 67A and 67B are provided in the shaft direction of these rotational shafts 62 and 63.

In this 3rd Embodiment, cutting blades 67 provided in the shaft direction of the rotational shafts 62 and 63 are configured so that the cutting blades 67A on the throw-in port side 69 are thinner, and the cutting blades 67B on the discharge port side 70 are thicker, similar to 2nd Embodiment as described above. Thereby, it is configured so that it crushes coarsely on the throw-in port side I, and crushes finely on the discharge port side O. In the meantime, 74 are traversing members.

Meanwhile, a lower portion of the shredder main body 61 has side faces of an inner wall curved toward the center of the lower portion, and formed with a discharge pocket 82 of a rectangular cross-section in a central portion in the shaft direction. This discharge pocket 82 is provided throughout the entire length in the shaft direction of the shredder main body 61. The discharge pocket 82 of this Embodiment is provided with an open/close door 83 in a lower surface, at one of the places of the shredder main body 61 divided into three in the shaft direction, that is the furthest place from a throw-in port 69 (right end), as shown in FIG. 10(*a*). A lower surface of the discharge pockets 82 other than the place at which this open/close door 83 is provided is covered, and the place in which the open/close door 83 is provided serves as a discharge port 70.

The open/close door 83 is configured so as to open/close in any state from a closed state as shown in FIG. 10(*b*) to an open state as shown in FIG. 10(*c*). An open/close mechanism of the open/close door 83 may be constituted by an open/close mechanism using a hydraulic cylinder or a hydraulic motor.

If the open/close door 83 is provided in the position as illustrated, since the shredable object T is crushed by all the cutting blades 67A and 67B provided in the shaft direction and discharged, the shredable object T can be discharged as small crushed objects in the finest crush size.

Moreover, as shown with two-point chain lines in FIG. 10(*a*), if the open/close door 83 is provided in the closest place to the throw-in port 69, a holding time of the shredable object T becomes the shortest and, thus, the shredable object T can be discharged as larger crushed objects. Furthermore, if the open/close door 83 is provided between this closest place to the throw-in port 69 and the furthest place, the holding time of the shredable object T becomes medium and, thus, the shredable object T can be discharged as medium crushed objects. In this way, The longer the distance from the throw-in port 69, the holding time of the shredable object T inside becomes longer, the number of crush repeated increases and, thus, the crush size becomes smaller.

Although an example in which the discharge ports 70 are provided in three places has been explained in this 3rd Embodiment, the number of discharge ports 70 is not limited to three places, and may be set according to the machine size, the discharge size of the shredable object T, etc.

According to the shredding machine 81 configured as described above, the crush size of the shredable object T may be changed in accordance with the holding time from the shredable object T is supplied into the throw-in port 69 until discharged from the discharge port 70, by setting up the position of the open/close door as required. In the meantime, since the action of repeatedly shredding the shredable object T for a plurality of times inside the shredder main body 61 is the same as that of 1st Embodiment as described above, the detailed explanation thereof will be omitted.

4th Embodiment

FIGS. 11(*a*)-(*d*) are drawings of a shredding machine showing 4th Embodiment of the present invention. FIG. 11(*a*) is a side view, partially cross-sectioned of an example in which a discharge port is provided at the furthest position from a throw-in port. FIG. 11(*b*) is a side view, partially cross-sectioned of an example in which the discharge port is provided between the furthest position and the closest position. FIG. 11(*c*) is a side view, partially cross-sectioned of an example in which the discharge port is provided at the closest position to the throw-in port. FIG. 11(*d*) is a longitudinal cross-sectional view of the throw-in port portion in of FIG. 11(*a*). This 4th Embodiment is an example in which a crush size of a shredable object T to be discharged from the shredding machine can be selected from three sizes similar to 3rd Embodiment as described above. In the meantime, the same configuration as 1st Embodiment as described above is illustrated by adding 90 to the reference numerals, and the detailed explanation thereof will be omitted. Moreover, also in this 4th Embodiment, a lower case of 1st Embodiment as described above is integrally formed with a shredder main body. Furthermore, an illustration of scrape-up members is omitted in the drawings.

As illustrated, this 4th Embodiment is configured so as to be similar to 3rd Embodiment as described above, such that cutting blades 97A on the throw-in port side 99 are thicker, and cutting blades 97B on the discharge port side 100 are thinner.

In the meantime, a lower portion of the shredder main body 91 has side faces of an inner wall that is curved toward the center of the lower portion, and is formed with a discharge pocket 112 of a rectangular cross-section in the shaft direction of the central lower portion. This discharge pocket 112 is provided throughout the entire length in the shaft direction of the shredder main body 1. The discharge pocket 112 in this Embodiment is formed so that the whole lower surface is open in a slot shape.

As shown in FIG. 11(*d*), a slide gate 113 that covers the lower surface of the discharge pocket 112 is provided in the shaft direction of the shredder main body 91. This slide gate 113 is formed to be in a size such that it covers one divided portion of the discharge pocket 112 that is divided approximately in three in the shaft direction, and the slide gate 113 is respectively provided to front and rear portions of the shredder main body 91 in the shaft direction. These slide gates 113 are configured so that they are slidable in the shaft direction of the shredder main body 91 by a slide jack 114 provided to the shredder main body 91.

Since the slide gate 113 divided in this way closes two portions of the discharge pocket 112 in which the entire length of the shredder main body 91 is divided in three in the shaft direction, one third portion of the discharge pocket 112 may be opened as a discharge port 100. In FIG. 11(*a*), the discharge pocket 112 is opened downwardly at a position furthest from the throw-in port 99. The portion with which the lower surface is not covered by this slide gate 113 serves as the discharge port 100.

Although, in this 4th Embodiment, an example in which the discharge port 100 is configured to be changed to three positions has been explained, the position of the discharge port 100 is not limited to three positions, and may be set according to the machine size, the discharge size of a shredable object T, etc.

According to the shredding machine 111 configured as described above, as shown in FIG. 11(*a*), since a distance from the throw-in port 99 to the discharge port 100 becomes the furthest when the throw-in port side I is closed by the slide gate 113 while the right end of the figure is opened, it can discharge as smaller crushed objects that is finely crushed by lengthening the holding time of the shredable object T. Moreover, as shown in FIG. 11(*b*), when the discharge pocket 112 is opened between the closest position and the furthest position from the throw-in port 99, it may be possible to discharge medium-size crushed objects by making the holding time of the shredable object T to the medium. Furthermore, as shown in FIG. 11(*c*), when the discharge pocket 112 is opened at the closest position to the throw-in port 99, the holding time of the shredable object T becomes the shortest, it may be possible to discharge large crushed objects. In this way, since the distance from the throw-in port 99 to the discharge port 100 is longer, the inside holding time of the shredable object T becomes longer, the number of crush repeating increases and, thus, the crush size can be smaller. In the meantime, since the action of repeating the crush of the shredable object T for a plurality of times inside the shredder main body 91 is the same as that of 1st Embodiment as described above, the detailed explanation thereof will be omitted.

5th Embodiment

Next, an example of a shredding machine that is added a function of discharging a foreign object mixed in a shredable object T to be thrown in will be explained. As described above, since as the shredable object T to be crushed by this kind of shredding machine, there are various and miscellaneous objects, an example of the shredding machine that is configured to be able to easily discharge a foreign object, such as metal, when it is mixed, out of the shredder main body will be explained in the following Embodiment.

Figure 12C:
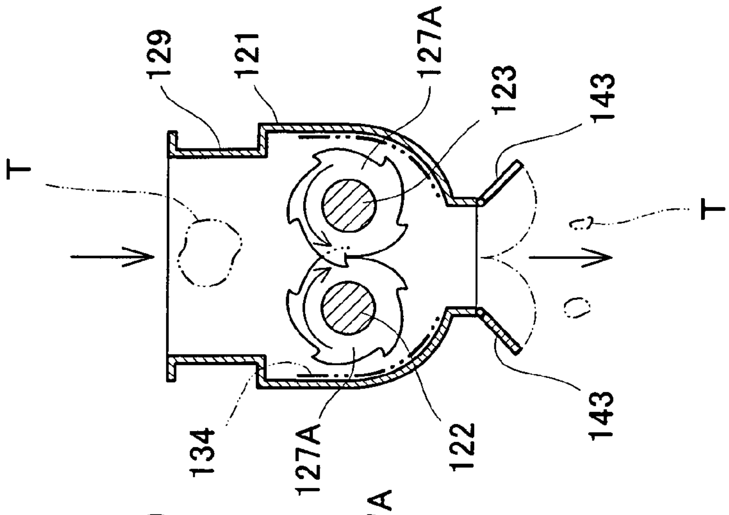
FIGS. 12(*a*)-(*c*) are drawings of a shredding machine showing 5th Embodiment of the present invention, FIG. 12(*a*) is a partially cross-sectional side view, FIG. 12(*b*) is a longitudinal cross-sectional view taken along a line XII-XII, at the time of closing an open/close door, and FIG. 12(*c*) a longitudinal cross-section, at the time of opening the open/close door.
Figure 12B:
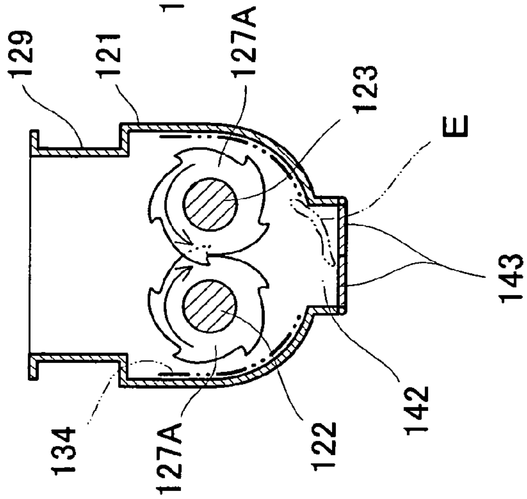
Figure 12A:
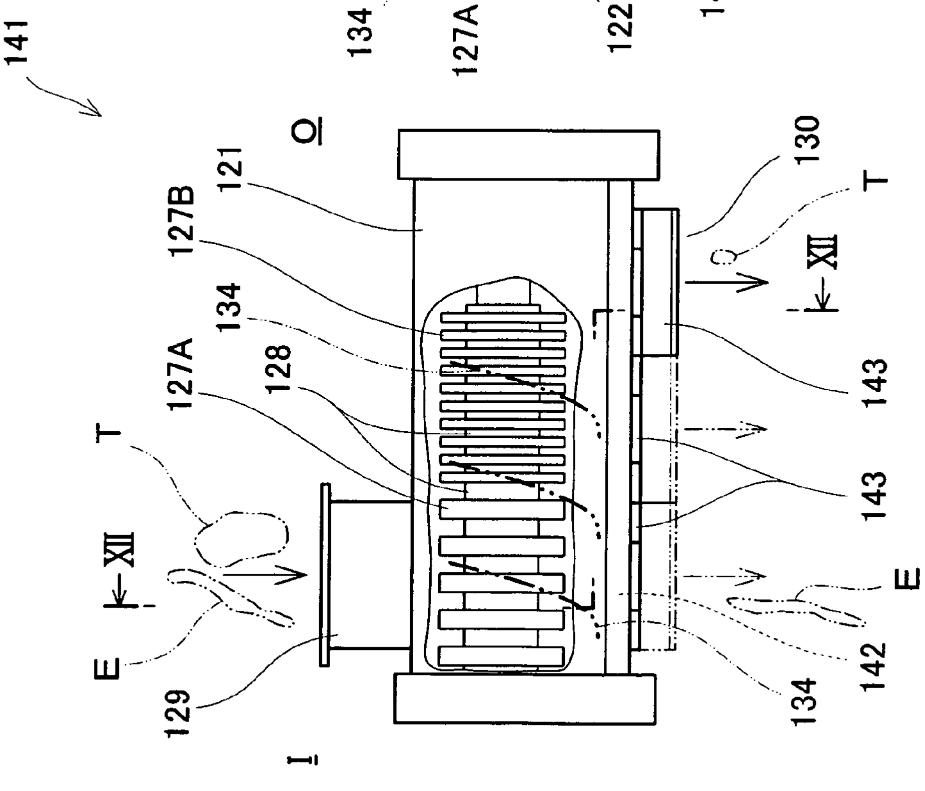

FIGS. 12(*a*)-(*c*) are drawings of the shredding machine showing 5th Embodiment of the present invention. FIG. 12(*a*) is a side view, partially cross-sectioned. FIG. 12(*b*) is a longitudinal cross-section taken along a line XII-XII, at the time of closing an open/close door. FIG. 12(*c*) is a longitudinal cross-section, at the time of opening the open/close door. This 5th Embodiment is an example in which the foreign object mixed into the shredable object T can be discharged from a lower portion of a shredder main body. In the meantime, the same configuration as 1st Embodiment as described above is shown by adding 120 to the reference numerals, and the detailed explanation thereof will be omitted. Moreover, also in this 5th Embodiment, the lower case of 1st Embodiment as described above is integrally formed with the shredder main body. Furthermore, in the figure, an illustration of scrape-up members is omitted.

Also in this 5th Embodiment, similar to 3rd Embodiment as described above, a thickness of cutting blades 127A on the throw-in port side 129 is formed thicker, and a thickness of cutting blades 127B on the discharge port side 130 is formed thinner. Thereby, it is configured so that it coarsely crushes on a throw-in port side I, and finely crushes on a discharge port side O.

As illustrated, in this Embodiment, usually, since the foreign object E that is a heavy object is collected on the lower portion of the shredder main body 121 when the foreign object E is thrown into the shredder main body 121, a foreign object pocket 142 is provided in the lower portion of this shredder main body 121.

Side faces of an inner wall of the lower portion of the shredder main body 121 are curved toward the center of the lower portion, this foreign object pocket 142 is formed in a downwardly rectangular cross-section in the shaft direction of the central portion. This foreign object pocket 142 is provided throughput the entire length of the shredder main body 121 in the shaft direction. In this Embodiment, as shown in FIG. 12(*a*), foreign object discharge dampers 143 are provided in a lower surface of the shredder main body 121, with an one-third length of the shredder main body 121 in the shaft direction.

Moreover, when the foreign object E enters in the foreign object pocket 142, changes are produced in the measurable operational state measured values such as, power, current, torque, oil pressure, vibration, etc., of a driver that drives rotational shafts 122 and 123. Thereby, it is configured to detect the changes, and open this foreign object discharge damper 143.

This foreign object discharge dampers 143 are configured so that each foreign object discharge damper 143 can be opened independently. An open/close mechanism of the foreign object discharge damper 143 may be constituted by an open/close mechanism using a hydraulic cylinder or a hydraulic motor. Controlling of amount of opening and closing the foreign object discharge damper 143 by these open/close mechanisms is controlled by a control device provided in the crusher.

According to the shredding machine 141 of 5th Embodiment configured as described above, when the foreign object E is thrown into the throw-in port 159 with the shredable object T, the foreign object E enters into the foreign object pocket 142 provided in the lower portion of the shredder main body 121. This entering of the foreign object E into the foreign object pocket 142 is detected as described above by the changes of the operational state measured values of the driver, and the foreign object discharge damper 143 is opened. Thereby, the foreign object E is discharged outside the crusher.

In the meantime, since the action of repeating the crush of the shredable object T for a plurality of times inside the shredder main body 121 is the same as that of 1st Embodiment as described above, the detailed explanation thereof will be omitted.

Moreover, since the foreign objects E, such as metal, is usually heavier, it may fall into the foreign object pocket 142 in the throw-in port portion in many cases. Thus, the foreign object discharge dampers 143 are configured so that an open position of the foreign object discharge dampers 143 are sequentially changed from the throw-in port side I to sequentially discharge the foreign object E. This open position and order of the foreign object discharge dampers 143 is not limited to this Embodiment.

In addition, by constituting so that the lower portion of the shredder main body 121 can be opened in the shaft direction in this way, the lower portion of the shredder main body 121 can be opened in the shaft direction if all of these foreign object discharge dampers 143 are opened. Thereby, discharging of the whole quantity of the shredable object T inside can be carried out, and cleaning inside the device at the time of change of the shredable object T can also be performed easily in a short time.

In the meantime, this foreign object pocket 142 in the shredding machine 141 of 5th Embodiment is similar in configuration to the configuration of the discharge pocket 82 in the shredding machine 81 of 3rd Embodiment as described above. Therefore, the discharge pocket 82 as described above may also be served as a foreign object pocket 142 into which the foreign object E enters, when the foreign object E, such as metal, is mixed in the shredable object T thrown into the throw-in port 129. By this, it can be easy to have the shredding machine 81 as described above equipped with a crush size changing and foreign object discharging mechanism.

6th Embodiment

Figure 13B:
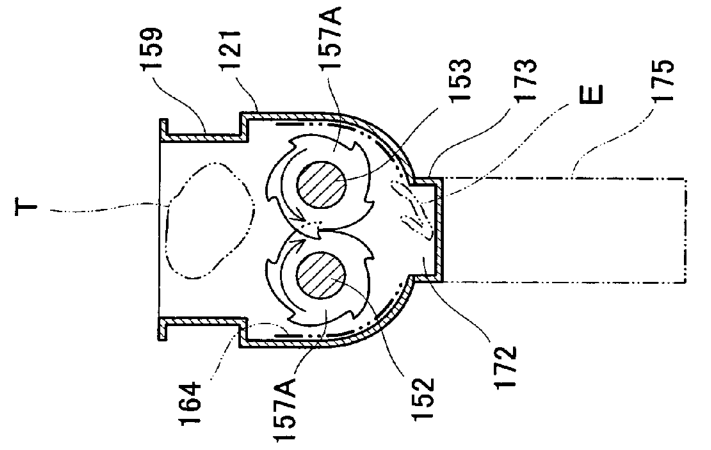
FIGS. 13(*a*) and (*b*) are drawings of a shredding machine showing 6th Embodiment of the present invention, FIG. 13(*a*) is partially cross-sectional side view, and FIG. 13(*b*) is a longitudinal cross-sectional view.
Figure 13A:
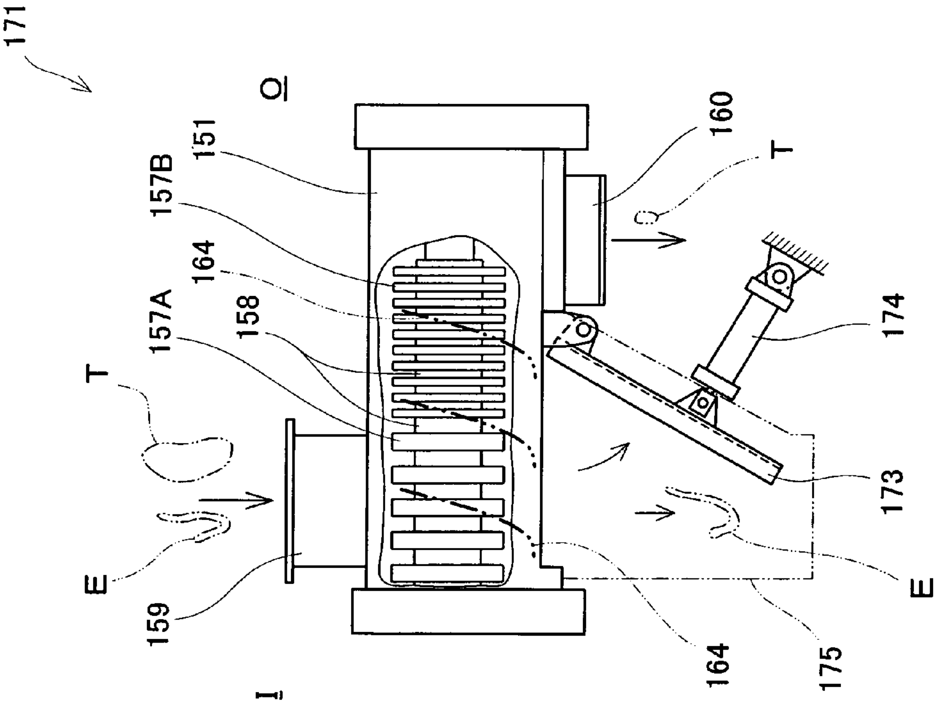

FIGS. 13(*a*) and (*b*) are drawings of a shredding machine showing 6th Embodiment of the present invention. FIG. 13(*a*) is a side view, partially cross-sectioned, and FIG. 13(*b*) is a longitudinal cross-section. This 6th Embodiment is an example in which it can discharge a foreign object by largely opening a lower portion of a foreign object pocket provided in a lower portion of a shredder main body. In the meantime, the same configuration as 1st Embodiment as described above, is shown by adding 150 to the reference numerals, and the detailed explanation thereof will be omitted. Moreover, also in this 6th Embodiment, the lower case of 1st Embodiment as described above is integrally formed with the shredder main body. Furthermore, in the figure, an illustration of the scrape-up members is omitted.

As illustrated, in this 6th Embodiment, a foreign object discharge damper 173 that is configured to be able to open the lower portion of the foreign object pocket 172 is provided from a lower portion of a throw-in port 159 up to near a discharge port 160. This foreign object discharge damper 173 is configured to be open downwardly by a jack 174 provided on the fixed side. In this Embodiment, a foreign object discharge chute 175 for discharging the foreign object E in the foreign object discharge damper 173 that is opened by this jack 174 is provided.

According to the shredding machine 171 of 6th Embodiment configured as described above, the foreign object E thrown with the shredable object T into the throw-in port 159 enters into the foreign object pocket 172 provided in a lower portion of a shredder main body 151. Entering of the foreign object E into this foreign object pocket 172 is detected as changes in the operational state measured values of a driver, as described above. As detecting the entering of the foreign object E into the foreign object pocket 172, the foreign object discharge damper 173 is opened by the jack 174. Thereby, the foreign object E is discharged outside the crusher. In the meantime, since the action of repeating the crush of the shredable object T for a plurality of times inside the shredder main body 151 is the same as that of 1st Embodiment as described above, the detailed explanation thereof will be omitted.

Moreover, according to this Embodiment, since the foreign object pocket 172 is opened integrally with a portion up to the discharge port, the foreign object E entered in the foreign object pocket 172 can be discharged in a short time.

7th Embodiment

Figures 14A, 14B, 14C:
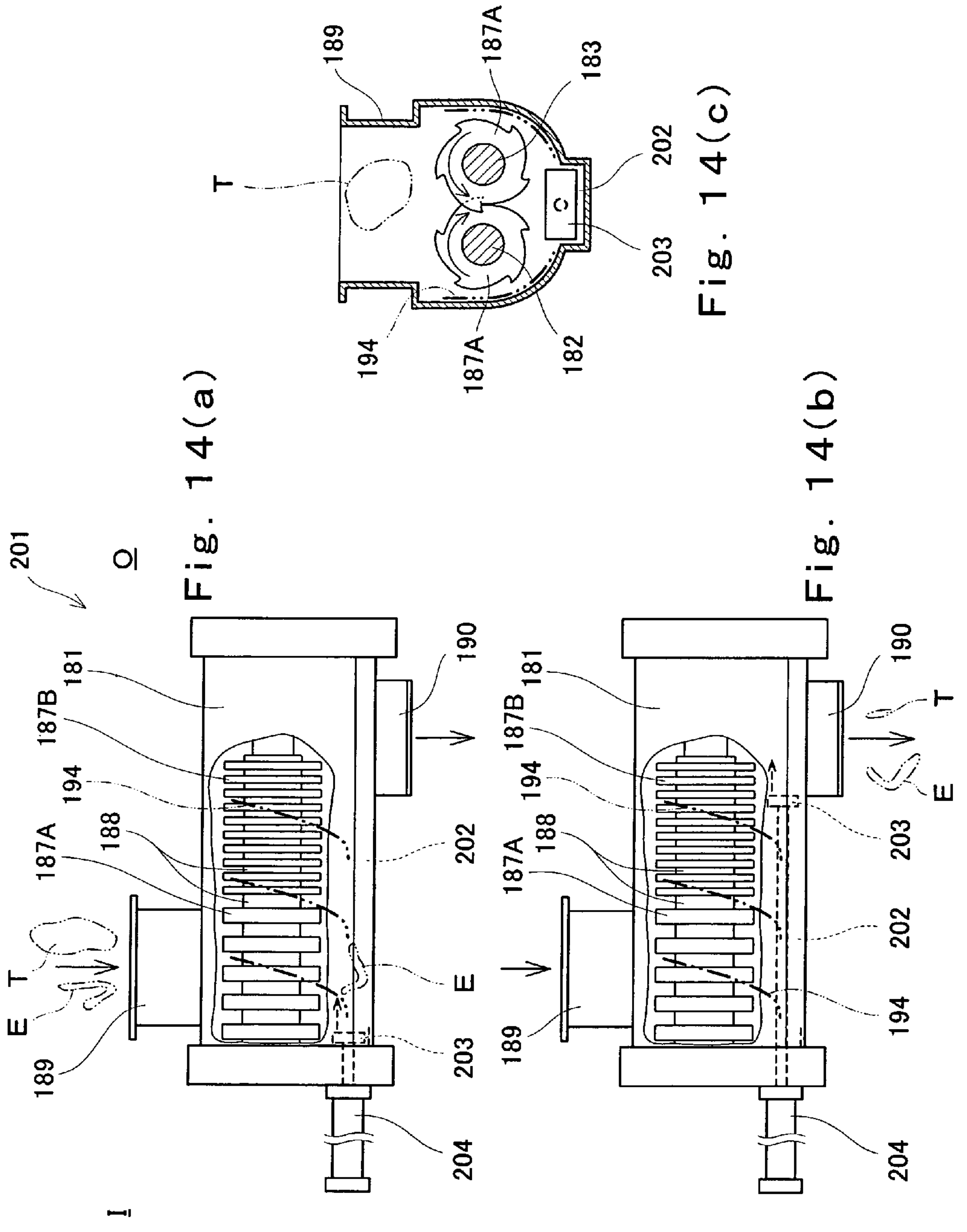
FIGS. 14(*a*)-(*c*) are drawings of a shredding machine showing 7th Embodiment of the present invention, FIG. 14(*a*) is partially cross-sectional side view before driving a pusher, FIG. 14(*b*) is a partially cross-sectional side view, at the time of driving the pusher, and FIG. 14(*c*) is a longitudinal cross-sectional view.

FIGS. 14(*a*)-(*c*) are drawings of a shredding machine showing 7th Embodiment of the present invention. FIG. 14(*a*) is a side view before driving a pusher, partially cross-sectioned. FIG. 14(*b*) is a side view at the time of driving the pusher, partially cross-sectioned. FIG. 14(*c*) is a longitudinal cross-sectional view. This 7th Embodiment is an example in which a foreign object is pushed from a throw-in port side of a shredder main body to a discharge port side, and is discharged from the discharge port. In the meantime, the same configuration as 1st Embodiment as described above is shown by adding 180 to the reference numerals, and the detailed explanation thereof will be omitted. Moreover, also in this 7th Embodiment, a lower case of 1st Embodiment as described above is integrally formed with the shredder main body. Furthermore, in the figure, an illustration of scrape-up members is omitted.

As illustrated, in this 7th Embodiment, the foreign object pusher 203 that extends from the lower portion of a throw-in port 189 to a discharge port 190 is provided inside a foreign object pocket 202. This foreign object pusher 203 is configured so that it may extend from the throw-in port side I to the discharge port side O by a jack 204 provided to the shredder main body 181.

According to the shredding machine 201 of 7th Embodiment configured as described above, the foreign object E thrown with the shredable object T into the throw-in port 189 enters into the foreign object pocket 202 provided in a lower portion of the shredder main body 181. This entering of the foreign object E into the foreign object pocket 202 is detected as changes in the operational state measured values of a driver as described above. As detecting the foreign object E entering into the foreign object pocket 202, by expanding the jack 204, the foreign object E can be pushed to the discharge port 190 by the foreign object pusher 203, and discharged from the discharge port 190. Thereby, the foreign object E is discharged outside the crusher. In the meantime, since the action of repeating the crush of the shredable object T for a plurality of times inside the shredder main body 181 is the same as that of 1st Embodiment as described above, the detailed explanation thereof will be omitted.

8th Embodiment

Figures 15A, 15B, 15C:
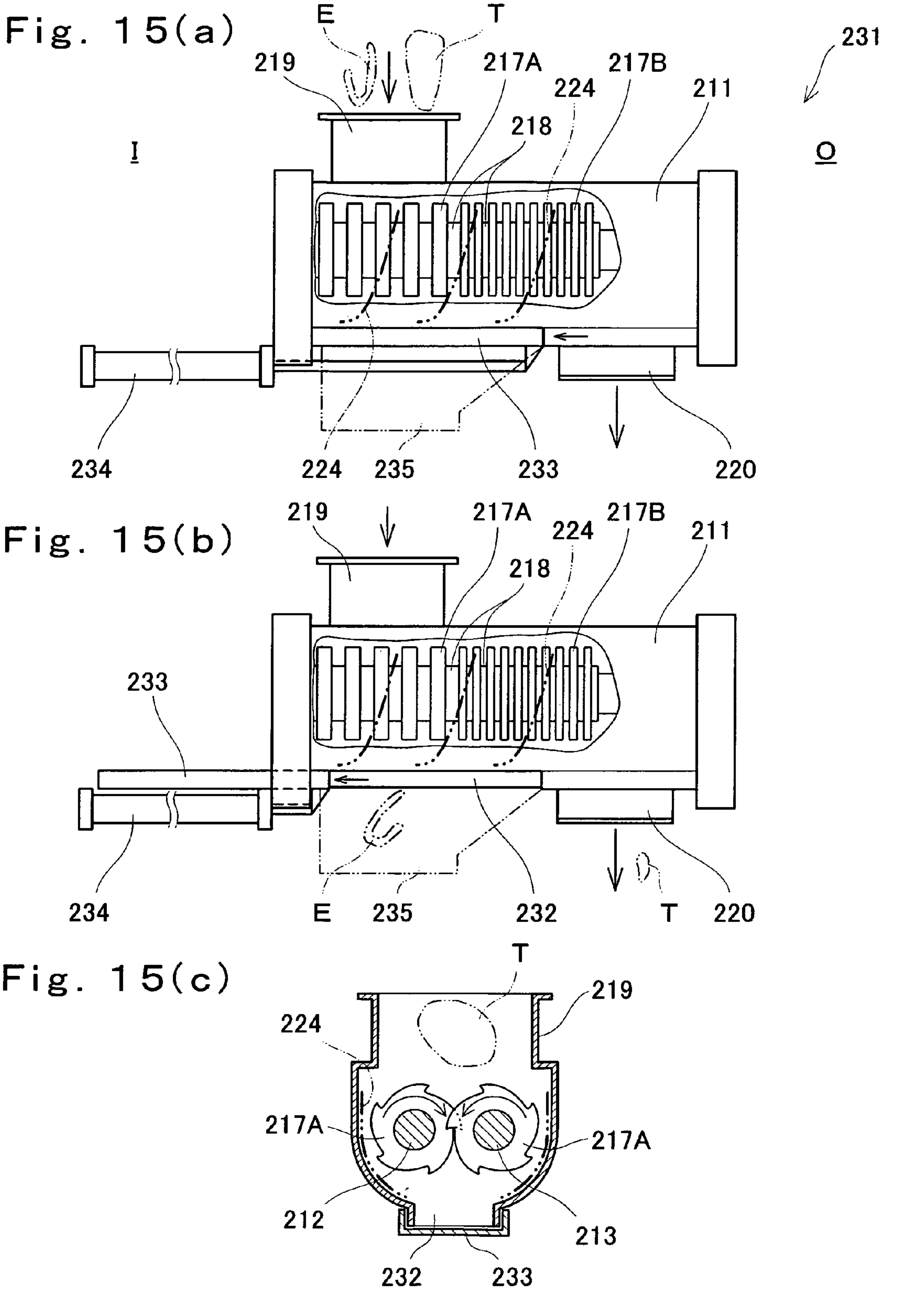
FIGS. 15(*a*)-(*c*) are drawings of the shredding machine showing 8th Embodiment of the present invention, FIG. 15(*a*) is a partially cross-sectional side view, at the time of closing a slide gate, FIG. 15(*b*) is a partially cross-sectional side view, at the time of opening the slide gate, and FIG. 15(*c*) is a longitudinal cross-sectional view.

FIGS. 15(*a*)-(*c*) are drawings of a shredding machine showing 8th Embodiment of the present invention. FIG. 15(*a*) is a side view at the time of closing a slide gate, partially cross-sectioned. FIG. 15(*b*) is a side view at the time of opening the slide gate, partially cross-sectioned. FIG. 15(*c*) is a longitudinal cross-section. This 8th Embodiment is an example in which a lower portion of a foreign object pocket of a lower body portion of a shredder main body can be opened to discharge a foreign object. In the meantime, the same configuration as 1st Embodiment as described above is shown by adding 210 to the reference numerals, and the detailed explanation thereof will be omitted. Moreover, also in this 8th Embodiment, a lower case of 1st Embodiment as described above is integrally formed with the shredder main body. Furthermore, in the figure, an illustration of scrape-up members is omitted.

As illustrated, in this 8th Embodiment, a foreign object discharge slide gate 233 for opening the lower portion of the foreign object pocket 232 from a lower portion of a throw-in port 219 up to near a discharge port 220 is provided. This foreign object discharge slide gate 233 is configured to open to a throw-in port side by a jack 234 provided to the shredder main body 211. In this Embodiment, a foreign object discharge chute 235 for discharging the foreign object E being fallen from the foreign object pocket 232 when the foreign object discharge slide gate 233 is open by this jack 234 is provided.

According to the shredding machine 231 of 8th Embodiment configured as described above, the foreign object E thrown with the shredable object T into the throw-in port 219 enters into the foreign object pocket 232 provided in the lower portion of the shredder main body 211. This entering of the foreign object E into the foreign object pocket 232 is detected as changes in the operational state measured values of the driver as described above. As detecting the foreign object E entering into the foreign object pocket 232, the foreign object discharge slide gate 233 is opened by the jack 234. Thereby, the foreign object E is discharged outside the crusher. In the meantime, since the action of repeating the crush of the shredable object T for a plurality of times inside the shredder main body 211 is the same as that of 1st Embodiment as described above, the detailed explanation thereof will be omitted.

9th Embodiment

Figure 16A:
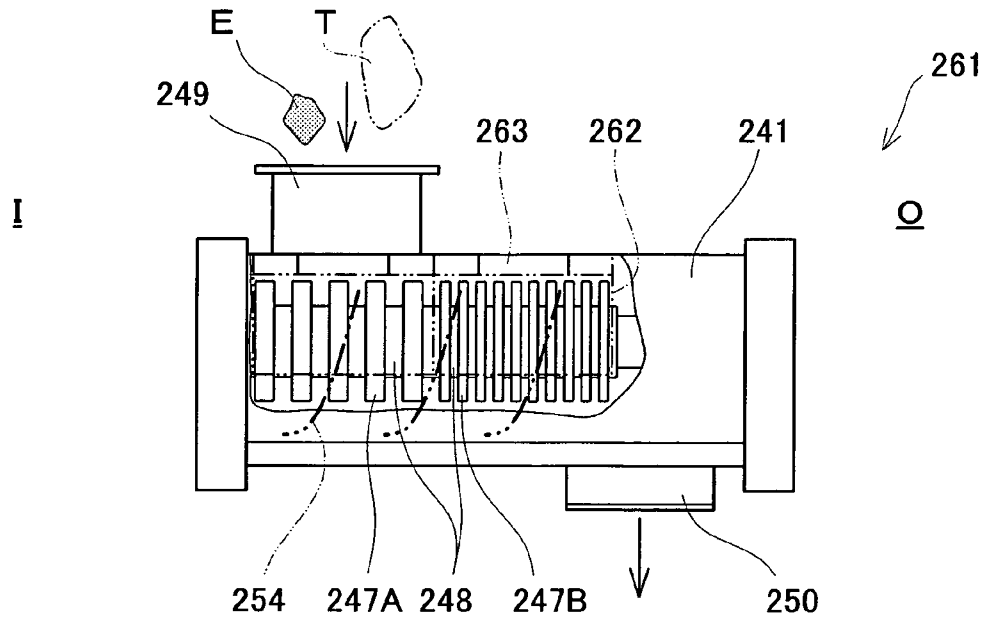
FIGS. 16(*a*)-(*c*) are drawings of the shredding machine showing 9th Embodiment of the present invention, FIG. 16(*a*) is a partially cross-sectional side view, FIG. 16(*b*) is a longitudinal cross-section when closing a foreign object discharge port, and FIG. 16(*c*) is a longitudinal cross-section when opening the foreign object discharge port.
Figure 16B:
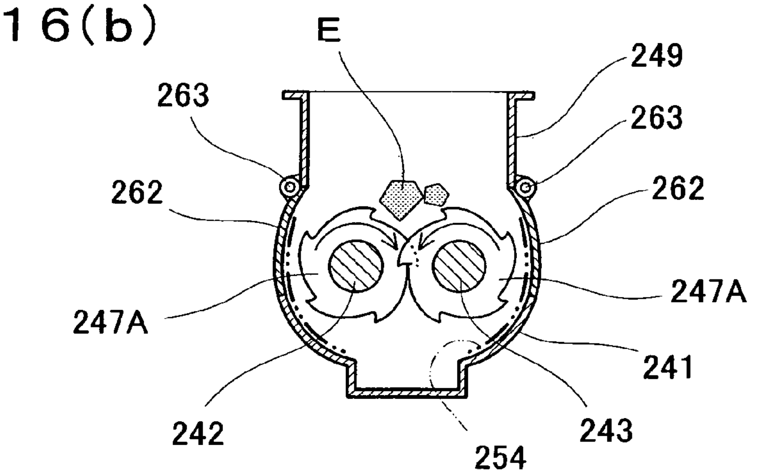
Figure 16C:
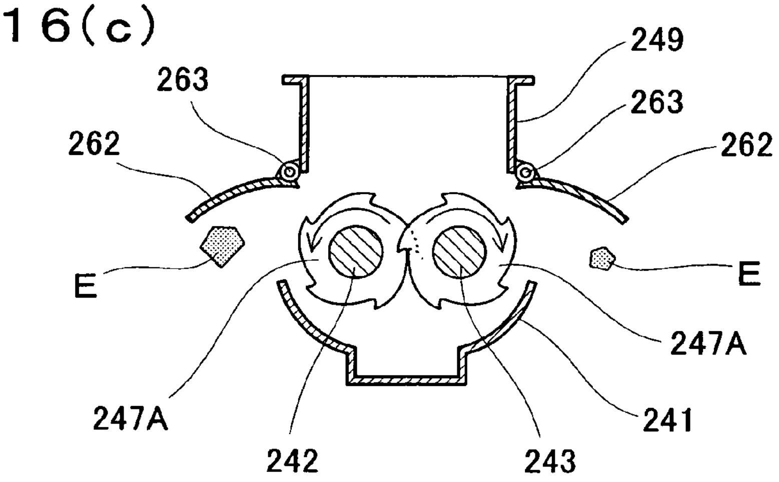

FIGS. 16(*a*)-(*c*) are drawings of a shredding machine showing 9th Embodiment of the present invention. FIG. 16(*a*) is a side view, partially cross-sectioned. FIG. 16(*b*) is a longitudinal cross-section at the time of closing a foreign object discharge port. FIG. 16(*c*) is a longitudinal cross-section at the time of opening the foreign object discharge port. This 9th Embodiment is an example in which a foreign object that does not fall from between the cutting blades down to a lower portion of a shredder main body can be discharged outside from side portions of the shredder main body. In the meantime, also in this 9th Embodiment, the same configuration as 1st Embodiment as described above is shown by adding 240 to the reference numerals, and the detailed explanation will be omitted. Moreover, also in this 9th Embodiment, a lower case of 1st Embodiment as described above is integrally formed with the shredder main body. Furthermore, in the figure, an illustration of scrape-up members is omitted.

As illustrated, in this 9th Embodiment, foreign object discharge side dampers 262 are provided in side portions of the shredder main body 241 so that the large foreign object E that does not fall from the upper portions of the cutting blades 247A and 247B provided on the rotational shafts 242 and 243 down to the lower portion of the shredder main body 241 can be discharged.

This foreign object discharge side damper 262 is supported by a shaft 263 provided in the horizontal direction in an upper portion thereof, and is configured to be able to open and close a lower portion thereof to the side. In this Embodiment, the foreign object discharge side dampers 262 are divided in two in the shaft direction of the shredder main body 241, and are provided in the left and right of the shredder main body 241. An open/close mechanism of the foreign object discharge side damper 262 is constituted by an open/close mechanism using a hydraulic cylinder or a hydraulic motor. In this Embodiment, although the foreign object discharge side damper 262 is divided in two in the shaft direction, the foreign object discharge side damper 262 may be divided suitably according to a length, a diameter, etc. of the shredder main body 241.

According to the shredding machine 261 of 9th Embodiment configured as described above, when the large foreign object E thrown into the throw-in port 249 is stacked in upper portions of the cutting blades 247A and 247B, this is detected as changes in the operational state measured values of a driver, as described above. As this foreign object E is detected, the drive of the rotational shafts 242 and 243 is stopped and, then, the foreign object discharge side dampers 262 are opened, and the rotation of the rotational shafts 242 and 243 are reversed to discharge the foreign object E on the cutting blades 247A and 247B outside the crusher through the foreign object discharge side dampers 262.

According to this 9th Embodiment, even the large foreign object E that does not fall down to the lower portion of the shredder main body 241 through between the cutting blades 247A and 247B can be discharged outside the crusher from the upper portions of the cutting blades 247A and 247B.

In the meantime, since the action of repeating the crush of the shredable object T for a plurality of times inside the shredder main body 241 is the same as that of 1st Embodiment as described above, the detailed explanation thereof will be omitted.

10th Embodiment

Figures 17A, 17B, 17C:
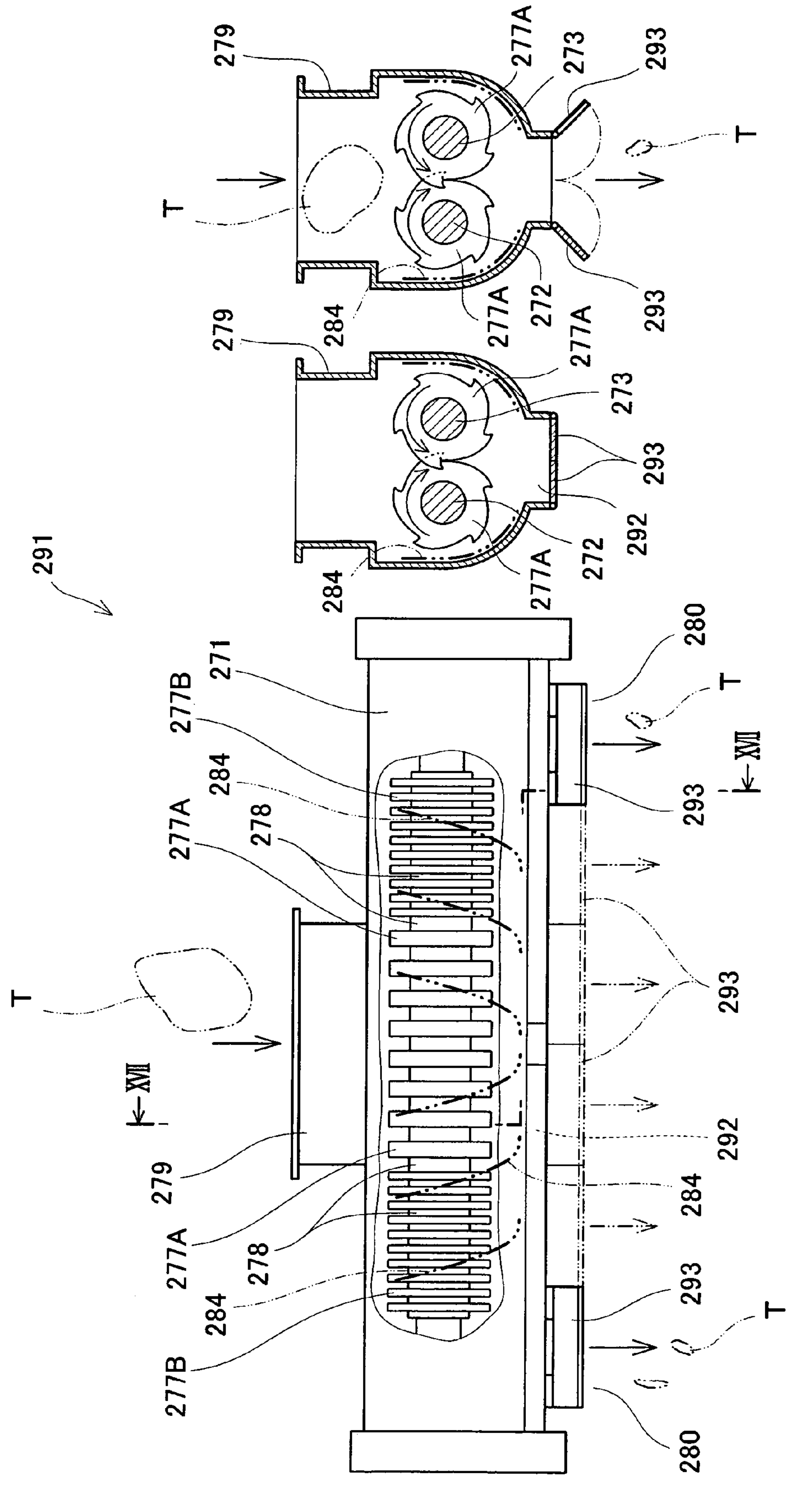
FIGS. 17(*a*)-(*c*) are drawings of the shredding machine showing 10th Embodiment of the present invention, FIG. 17(*a*) is a partially cross-sectional side view, FIG. 17(*b*) is a longitudinal cross-section taken along a line XVII-XVII, at the time of closing an open/close door, and FIG. 17(*c*) is a longitudinal cross-section, at the time of opening the open/close door.

FIG. 17(*a*)-(*c*) are drawings of a shredding machine showing 10th Embodiment of the present invention. FIG. 17(*a*) is a side view, partially cross-sectioned. FIG. 17(*b*) is a longitudinal cross-sectional view taken along a line XVII-XVII, at the time of closing an open/close door. FIG. 17(*c*) a longitudinal cross-section, at the time of opening the open/close door. This 10th Embodiment is an example in which a throughput of one shredding machine is doubled. In the meantime, also in this 10th Embodiment, the same configuration as 1st Embodiment as described above is shown by adding 270 to the reference numerals, and the detailed explanation will be omitted. Moreover, also in this 10th Embodiment, a lower case of 1st Embodiment as described above is integrally formed with a shredder main body. Furthermore, in the figure, an illustration of scrape-up members is omitted.

As illustrated, the shredder main body 271 in this 10th Embodiment is formed so as to be longer in the shaft direction, and a throw-in port 279 is provided in a central upper portion. Inside the shredder main body 271, two rotational shafts 272 and 273 are rotatably provided so as to be in parallel. Cutting blades 277 are provided on these rotational shafts 272 and 273 in the shaft direction.

In this 10th Embodiment, the cutting blades 277 provided in the shaft direction of the rotational shafts 272 and 273 include thicker cutting blades 277A disposed below the throw-in port 279, and thinner cutting blades 277B disposed, away from this cutting blades 277A, and toward the discharge ports 280 on both the ends. Thereby, it is configured so that the cutting blades 277A coarsely crush below the throw-in port 279, and the cutting blades 277B finely crush on the discharge port side O. In addition, in this 10th Embodiment, since the shredable object T thrown into the throw-in port 279 is crushed while it is forwarded in both the shaft directions (left and right directions in the figure) of the shredder main body 271, the throughput can be doubled.

Also in this 10th Embodiment, a lower portion of the shredder main body 271 includes side faces of an inner wall thereof that curve toward the center of the lower portion, and a discharge pocket 292 of a rectangular cross-section provided in the shaft direction of the central portion.

This discharge pocket 292 is provided throughout the entire length of the shredder main body 271 in the shaft direction. In this Embodiment, as shown in FIG. 17(*a*), this discharge pocket 292 is divided into three in the shaft direction respectively from the central portion of the shredder main body 271, and an open/close door 293 is provided in a lower surface, at a position furthest from the throw-in port 279. Lower surfaces of the discharge pockets 292 other than the one at a position where this open/close door 293 is provided are covered. The position where the open/close door 293 is provided serves as a discharge port 280.

The open/close door 293 is configured so that it is possible to be in any open/close state, from a closed state as shown in FIG. 17(*c*) to an open state as shown in FIG. 17(*b*). An open/close mechanism of the open/close door 293 may be constituted by an open/close mechanism using a hydraulic cylinder or a hydraulic motor. Moreover, if the open/close door 293 is provided in the position illustrated, since the shredable object T is crushed by all the cutting blades 277A and 277B provided in the shaft direction and discharged, it is discharged as small crushed objects that are the finest in a crush size.

Moreover, as shown with two-point chain lines in FIG. 17(*a*), if the open/close door 293 is provided at the closest position to the throw-in port 279, the holding time of the shredable object T is the shortest, and it can be discharged as large crushed objects. Furthermore, if the open/close door 293 is provided between the closest position and the furthest position from this throw-in port 279, the holding time of the shredable object T can be medium, and it can be discharged as medium-size crushed objects. Thus, as the distance from the throw-in port 279 is further, the internal holding time of the shredable object T becomes longer, and the number of repeating the crush increases and, thus, the crush size becomes smaller.

In this 10th Embodiment, it is configured so that the location of the discharge port 280 can be changed among three places respectively with respect to the central portion, however, the number of changable places for the discharge port 280 is not limited to three, and may be set according to the size of the shredder main body 271, the discharge size of the shredable object T, etc.

According to the shredding machine 291 configured as described above, the crush size of the shredable object T may be easily changed by setting the position of the open/close door 293 as needed. In addition, since the shredable object T, that is thrown-in from the central portion, is forwarded to the left and right, and crushed, the throughput can be doubled.

In the meantime, since the action of repeating the crush of the shredable object T for a plurality of times inside the shredder main body 271 is the same as that of 1st Embodiment as described above, the detailed explanation thereof will be omitted.

Furthermore, similar to 5th Embodiment as described above, a discharge pocket 292 of this 10th Embodiment may also be equipped with a function of the foreign object pocket into which the foreign object E enters when the foreign object E, such as metal, is mixed in the shredable object T thrown into the throw-in port 279. A foreign object discharge mechanism when the foreign object enters into this discharge pocket 292 may be configured to be similar to that of 5th Embodiment as described above.

Moreover, it may be possible to configure the shredding machines 21-261 of 1st Embodiment through 9th Embodiment as described above similar to the shredding machine 291 of this 10th Embodiment, to double the throughput. The configuration of center throw-in and left-and-right discharge may be employed if needed.

Furthermore, in this 10th Embodiment, although it has been configured to be symmetrical with respect to the throw-in port 279, the configuration of the cutting blades 277A and 277B on the left and right may be differed, or the distance to the discharge position may be differed, to obtain crushed objects in different sizes for one shredable object T. Such combination may be selected according to a type, crush conditions, etc., of the shredable object T.

11th Embodiment

Figure 18:
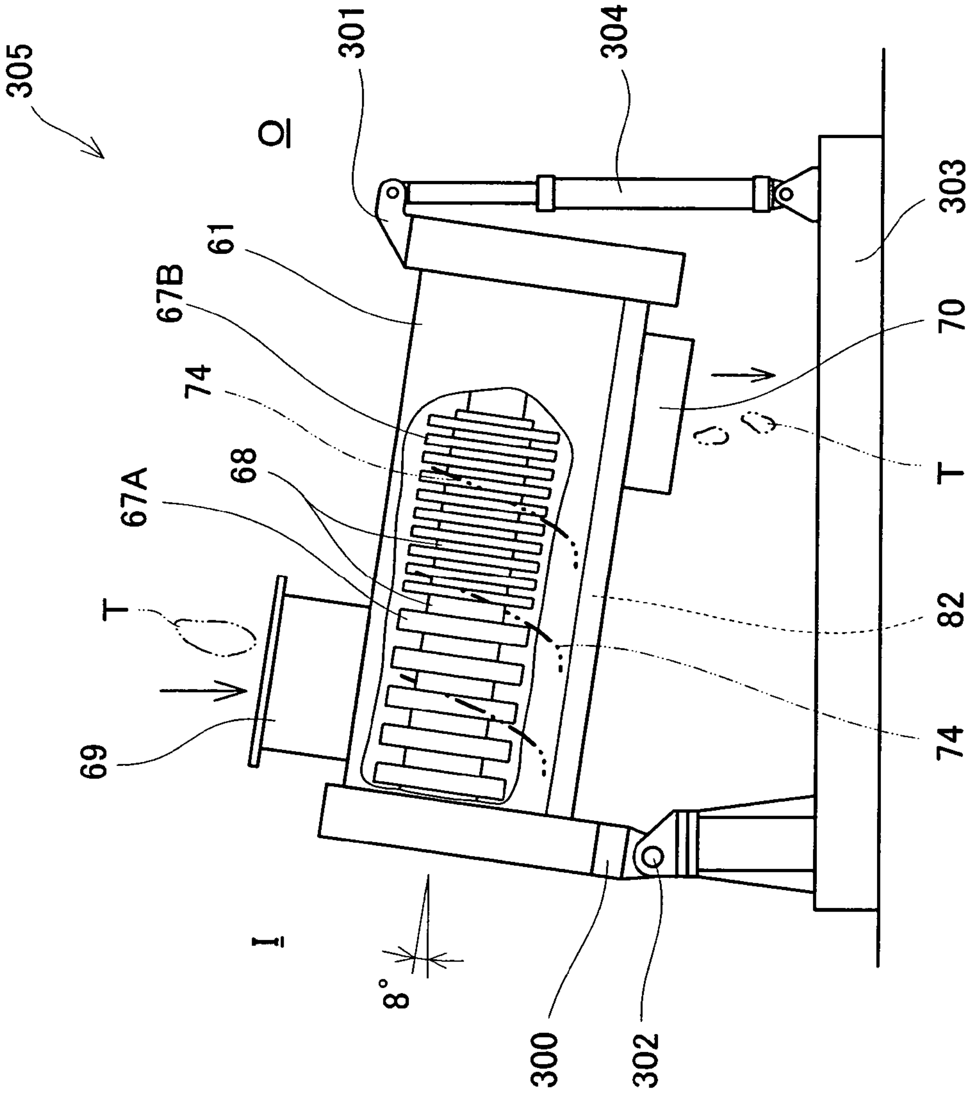
FIG. 18 is a side view of a shredding machine showing 11th Embodiment of the present invention.

FIG. 18 is a side view of a shredding machine showing 11th Embodiment of the present invention. This Embodiment is an example in which a tilt angle of a shredder main body is configured to be variable. Moreover, this 11th Embodiment shows a configuration for performing an example experiment which will be described hereinafter. In the meantime, in this figure, since it shows an example in which the shredding machine 61 of 3rd Embodiment as described above is tilted, the same reference numerals are used for the same configuration, and the detailed explanation thereof will be omitted. Moreover, also in 11th Embodiment, an illustration of scrape-up members is omitted in the figure.

As illustrated, the shredder main body 61 is provided with a rear-portion supporting portion 300 in a lower portion thereof on a throw-in port side I, and a front-portion supporting portion 301 in an upper portion on a discharge port side O. A support shaft 302 is provided in the rear-portion supporting portion 300, and this support shaft 302 is supported by a mounting base 303. A tip-end of a jack 304, as a driver, is pivotally supported by the front-portion supporting portion 301, and a rear end of this jack 304 is pivotally supported by the mounting base 303.

According to the shredding machine 305 configured in this way, by expanding or contracting the jack 304 as the driver, the discharge port side O of the shredder main body 61 goes up or down and, thus, the tilt angle of this shredder main body 61 can be changed.

Therefore, the shredable object T thrown into the throw-in port 69 is scraped up inside the shredder main body 61 while it is forwarded to the discharge port side O by the tilt and, thus, a plurality times of crush are performed to finely crush.

Example Experiment

Figure 19A:
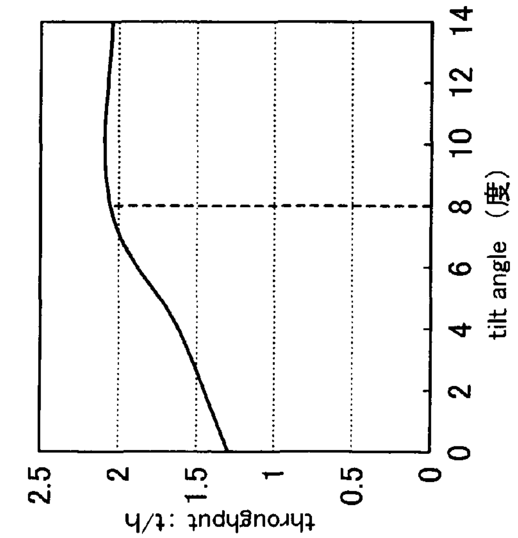
FIGS. 19(*a*), (*b*), and (*c*) are graphs showing experimental results of shredding soft waste plastics by the shredding machine shown in FIG. 18.
Figure 19B:
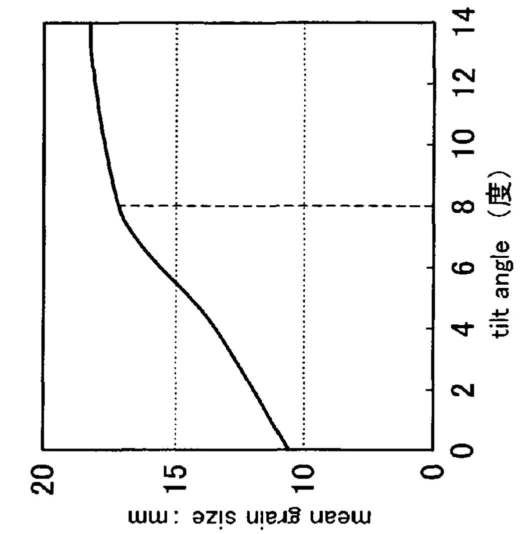
Figure 19C:
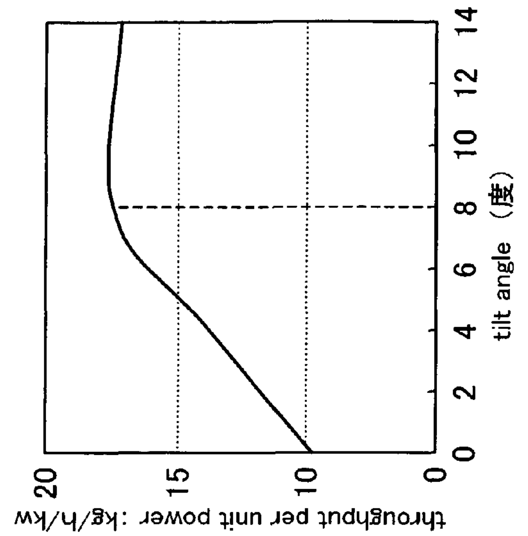

FIGS. 19(*a*), (*b*), and (*c*) are graphs showing experimental results of shredding soft waste plastics by the shredding machine shown in FIG. 18. This experiment is performed by a twin-shaft shredding machine, under the conditions of:

shredable object T: soft waste plastics, such as poly film sheets for large-sized packing, a polyethylene film, and a flexible container bag, grain size of shredable object T: long object longer than 1 m (approximately 90%), shorter than 1 m (approximately 10%), thickness of cutting blades: 75 mm on throw-in port side, 25 mm on discharge port side, and rotational speed control of cutting blades: both shafts are alternated at 20-second interval between a high-speed normal rotation (approximately 35 rpm) and a low-speed normal rotation (approximately 15 rpm), and the results will be shown.

As shown in FIG. 19(*a*), regarding a relationship between the tilt angle and the throughput, the throughput becomes larger by tilting the shredder main body, but it does not show apparent changes above approximately 8 degrees of tilt. As show in FIG. 19(*b*), regarding a relationship between the tilt angle and a mean grain size, a diameter of the grain becomes larger by tilting. This may be considered that a flow of the shredable object becomes faster. As shown in FIG. 19(*c*), regarding a relationship between the tilt angle and the throughput per unit power, although the throughput per unit power becomes larger by tilting, it does not show apparent changes above approximately 8-10 degrees of tilt.

From these facts, the optimal tilt angle that can maximize the throughput, while making the mean grain size smaller, and making the throughput per unit power larger is approximately 8 degrees. Moreover, by alternating the both shafts between the high-speed normal rotation and the low-speed normal rotation, a cleaning effect in which the shredable object T does not deposit between the cutting blades has been acquired. In the meantime, this approximately 8 degrees of tilt angle includes a range of approximately 6-10 degrees without the apparent changes.

<Rotational Speed Control>

Figure 20A:
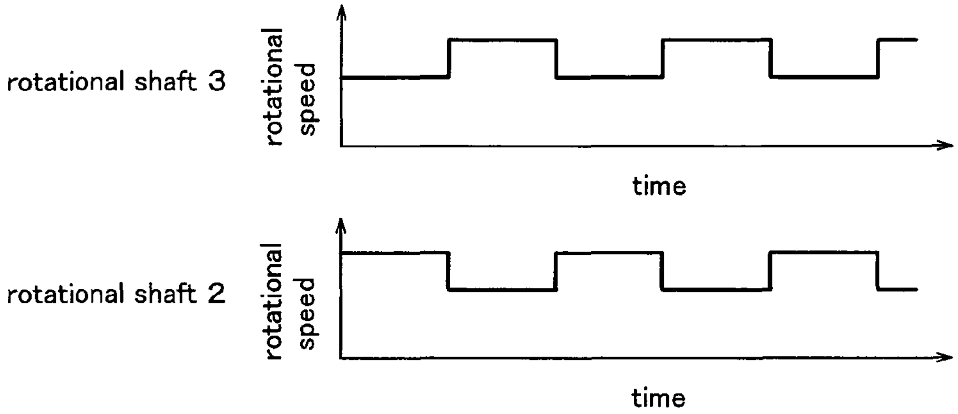
FIGS. 20(*a*) and (*b*) are time charts showing examples of a rotational speed control of rotational shafts in the shredding machine of the present invention.
Figure 20B:
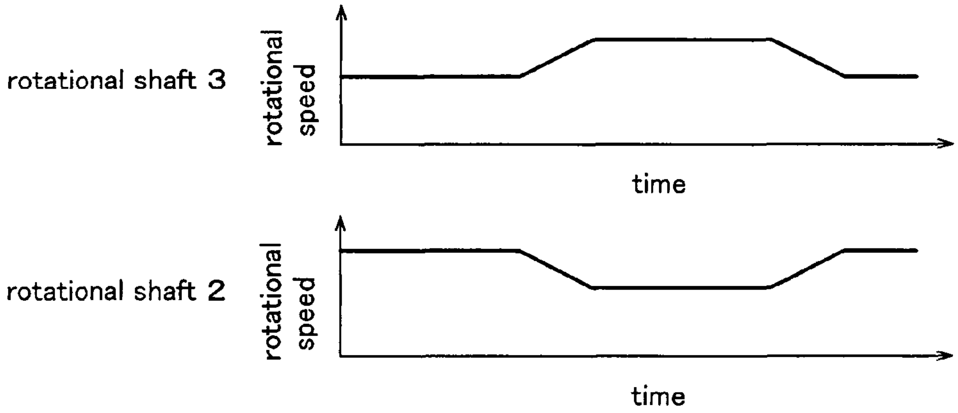

FIGS. 20 (*a*) and (*b*) are time charts showing examples of a rotational speed control of the rotational shafts in the shredding machine of the present invention.

By the way, if it is configured that the shredable object T thrown into the throw-in port as described above is crushed by the cutting blades 7, 37, 67, 97, 127, 157, 187, 217, 247, and 277, and forwarded to the transverse direction while the shredable object T is crushed for a plurality of times, it may be impossible to provide the scrapers, for removing the shredable object deposited to the cutting blades, to the side faces of the shredder main body 1, 31, 61, 91, 121, 151, 181, 211, 241, and 271.

Therefor, the shredable object T, etc. deposited to the cutting blades 7, 37, 67, 97, 127, 157, 187, 217, 247, and 277 may stay depositing to, and without falling off from the cutting portions (20) of the cutting blades 7, 37, 67, 97, 127, 157, 187, 217, 247, and 277. Especially, the soft shredable object T such as a vinyl rope may come off, once wound around the cutting blades 7, 37, 67, 97, 127, 157, 187, 217, 247, and 277 during crush. Such a shredable object T depositing to the cutting portions (20) may greatly reduce the crush effect. Moreover, by a great resistance produced between the side faces of the cutting blades 7, 37, 67, 97, 127, 157, 187, 217, 247, and 277 during crush, heat may be generated in the cutting blades. Thus, the shredable object T may be molten by heat and may deposit. This may greatly reduce the crush effect.

Consequently, as shown in 1st and 2nd Embodiments as described above, the drivers 5, 6, 35, and 36 for independently driving both the rotational shafts 2, 3, 32, and 33. As shown with the time charts in FIG. 20, if it is configured such that each rotational shaft 2, 3, 32, and 33 is independently rotated at different rotational speeds, the wound shredable object T can be removed even if the shredable object T winds around the cutting blades 7 and 37, by changing the rotational speeds of both the rotational shafts 2, 3, 32, and 33. In addition, as the time charts, the rotational speeds of respective rotational shafts 2, 3, 32, and 33 are interchanged between the high speed and the low speed and, further, if the interchange between the high speed and the low speed is controlled so as to be repeated, it is ensured that the wound shredable object T can be removed. This may be possible in all the Embodiments described above.

Thus, the function to give a change in the rotational speeds of both the rotational shafts 2, 3, 32, and 33, or to interchangeably drive both the rotational shafts 2, 3, 32, and 33 between the high speed and the low speed at a predetermined interval is provided to a control device equipped in the crusher.

Figure 21A:
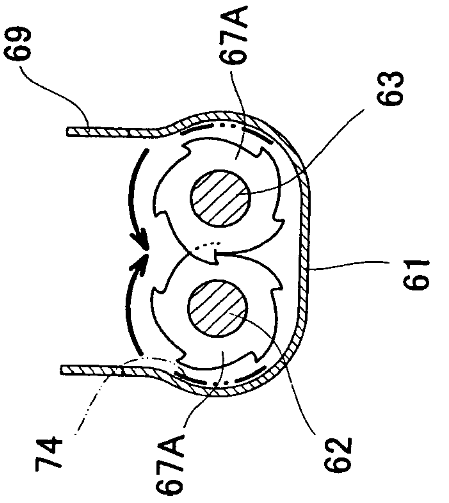
FIGS. 21(*a*), (*b*), and (*c*) are schematic views showing examples of a driving direction and a driving speed of the rotational shafts in the shredding machine of the present invention.
Figure 21:
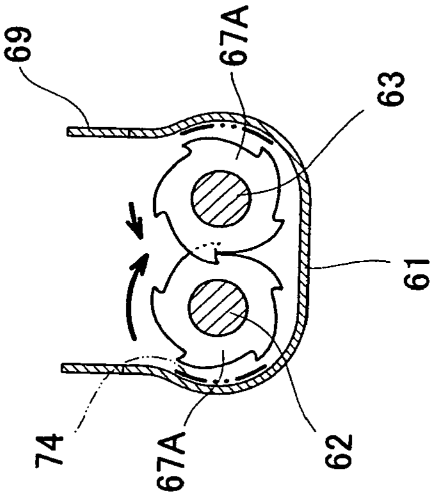
Figure 21C:
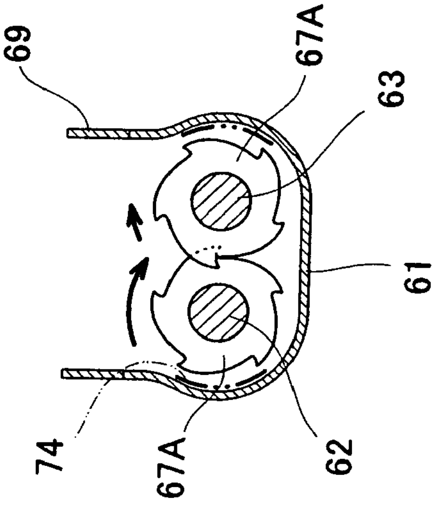
Figure 22:
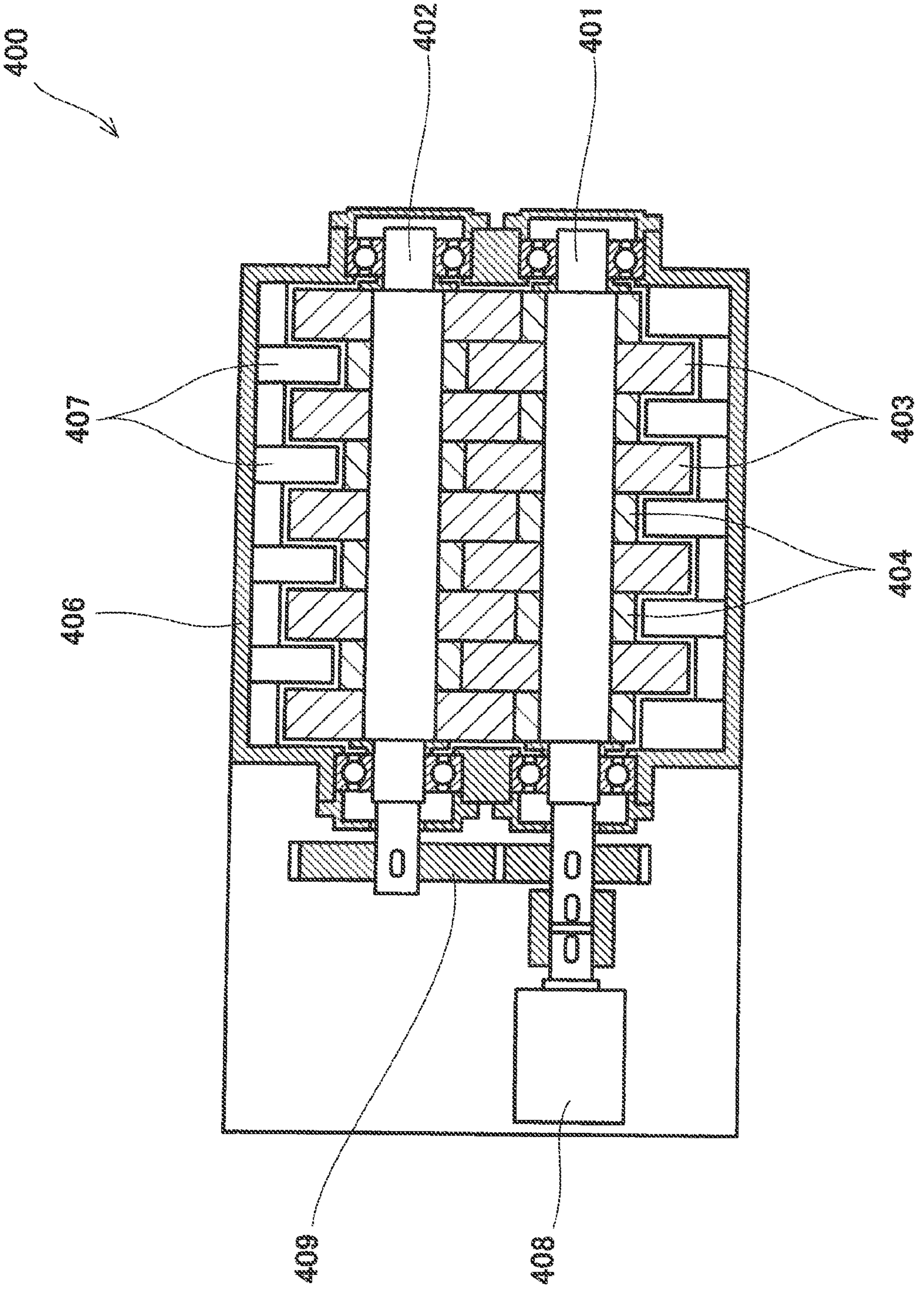
Fig. 22 Prior Art
FIG. 22 is a plan view showing a conventional shredding machine.
Figure 23:
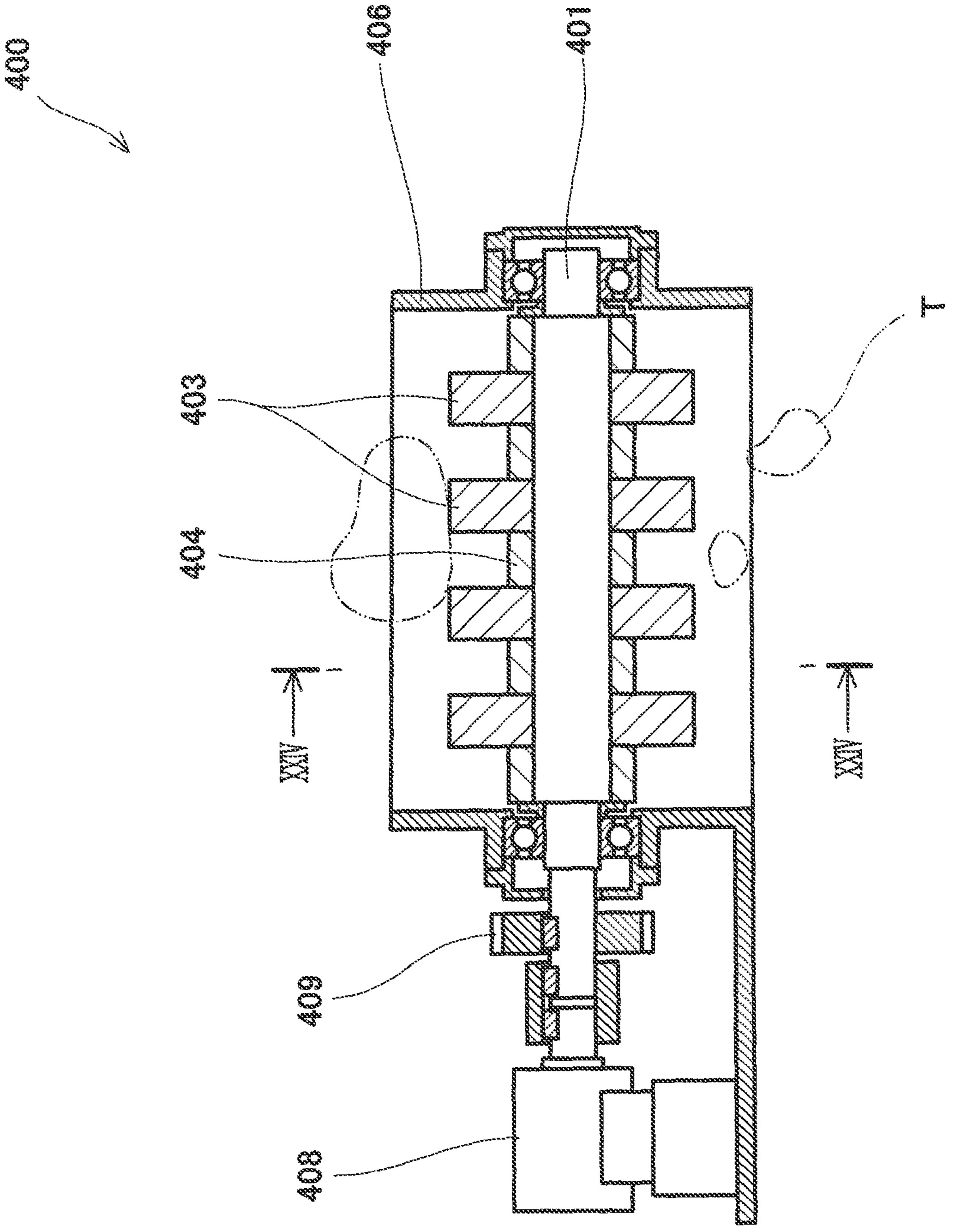
Fig. 23 Prior Art
FIG. 23 is a longitudinally cross-sectional side view of the shredding machine shown in FIG. 22.
Figure 24:
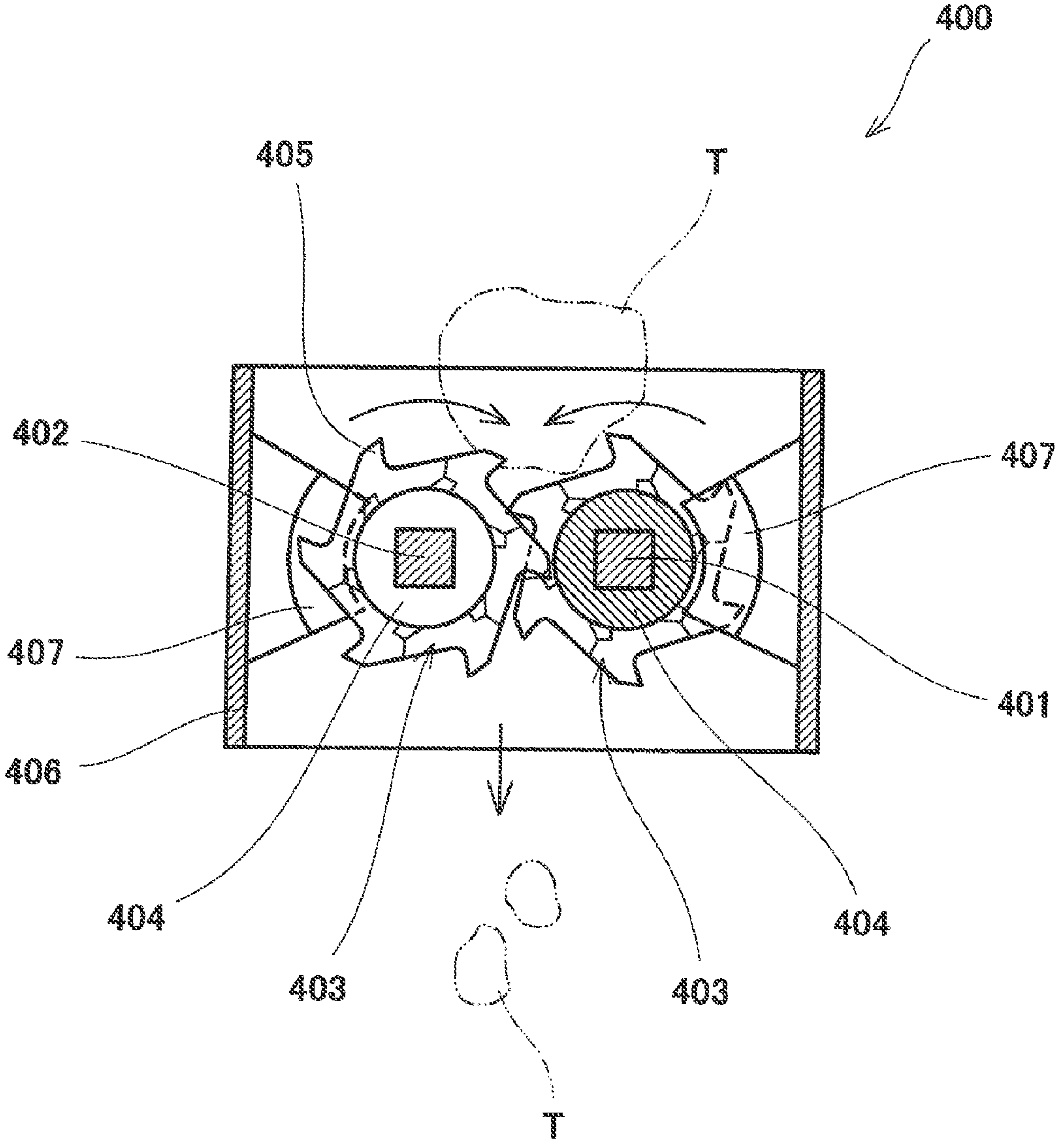
Fig. 24 Prior Art
FIG. 24 is a cross-sectional view taken along a line XXIV-XXIV shown in FIG. 23.

FIGS. 21(*a*), (*b*), and (*c*) are schematic views showing examples of driving directions of the rotational shafts and driving speeds in the shredding machine of the present invention. As illustrated, a relationship between the driving directions and the driving speeds of the rotational shafts in the shredding machine described above may be selected from, a method of carrying out a normal rotation (both shafts rotating to the center side) at the same rotational speed as shown in FIG. 21(*a*), a method of carrying out a normal rotation with one shaft (right-hand side in the illustration) at a low speed as shown in FIG. 21(*b*), and a method of carrying out a reverse rotation of one shaft (clockwise rotation in the illustration) at a low speed as shown in FIG. 21(*c*).

As shown in FIG. 21(*a*), by carrying out the normal rotation at the same rotational speed, a shredable object can be crushed at once by both the shafts. As shown in FIG. 21(*b*), by carrying out the normal rotation with one shaft (right-hand side in the illustration) at the low speed, a jam of the shredable object can be reduced. As the rotational speed difference of the rotational speed control for this case, for example, approximately 2:1 ratio between the high speed and the low speed may be adopted, but the other combination may be adopted. As shown in FIG. 21(*c*), even when carrying out a reverse rotation of one shaft (right-hand side in the illustration) at the low speed, the jam of the shredable object can be reduced. As the rotational speed difference of the rotational speed control for this case, it is preferable to adopt a large rotational speed difference (speed difference), for example, approximately 10:1 ratio between the high speed and the low speed, to prevent a jam while the shearing effect is maintained, but the other combination may be adopted. This control mode is also suitable for crush of a shredable object that easily winds around. A selection among these control modes may be made automatically or manually in a suitable direction according to crush conditions, such as an easiness of the jam of the shredable object T.

Thus, by carrying out the rotation control of the rotational shafts, a generation of the overload is reduced by the jam control of the shredable object T that is easily stacked and, thus, the crush throughput can be improved.

In the meantime, a portion or all of the Embodiments described above may be combined, and the configurations in the Embodiments may be suitably combined according to an operating condition, etc.

Moreover, 1st-11th Embodiments described above show examples, and they may be possible to vary within a scope the present invention without departing from the spirit thereof and, thus, the present invention is not limited to 1st-11th Embodiments described above.

INDUSTRIAL APPLICABILITY

According to the shredding machine according to the present invention, it is possible to make the crush size of the shredable object smaller, and it is useful for shredding when finely shredding the shredable object without increasing an installation space.

The invention claimed is:

1. A shredding machine for finely shredding a shredable object, comprising:

- a plurality of rotational shafts extending in parallel in a longitudinal direction so as to support cutting blades in the transverse direction inside a shredder main body, wherein the cutting blade is provided with a plurality of cutting portions protruding from the peripheral of the cutting blade, and the cutting blades are disposed in the longitudinal direction of the rotational shafts so that the cutting portions engage with each other;
- a throw-in port for the shredable object provided in an upper portion of the shredder main body; and
- a discharge port for the shredable object provided in a lower portion of the shredder main body;
- wherein in order to finely crush the shredable object thrown into the throw-in port, inside the shredder main body, the discharge port is disposed so as to be offset in the longitudinal direction of the rotational shafts with respect to the throw-in port so that the shredable object is scraped up from the lower portion to the upper portion while traveling downstream from a throw-in port side to a discharge port side, to crush the shredable object several times before discharge of portions of the crushed object through the discharge port,
- wherein a spiral traversing member is provided on an inner wall of the shredder main body with the spiral traversing member configured to assist in causing the object to travel upwardly and downstream in the longitudinal direction as the object is being crushed.

2. The shredding machine of claim 1, wherein predetermined perforations are formed in the shredder main body below the throw-in port.

3. The shredding machine of claim 1, wherein the spiral traversing member is configured to be a spiral protruded member that is provided on the inner wall of the shredder main body, up to approximately an upper end position of the cutting blade.

4. The shredding machine of claim 1, wherein the shredder main body is configured to be tilted by arranging that the throw-in port side of the shredder main body is higher than the discharge port side to assist in causing the shredable object to travel downstream from the throw-in port side to the discharge port side using the tilt thereof.

5. The shredding machine of claim 4, wherein the tilt angle of the shredder main body is configured to be variable by providing a driver for raising and lowering the throw-in port side or the discharge port side of the shredder main body.

6. The shredding machine of claim 4, wherein the shredding machine is for finely shredding a soft waste plastic as the shredable object, and wherein the shredder main body is configured tilt by approximately 8 degrees so that it crushes the soft waste plastic thrown into the throw-in port for a plurality of times by traversing the soft waste plastic toward the discharge port side while scraping up the soft waste plastic from the lower portion to the upper portion of the shredder main body.

7. The shredding machine of claim 1, wherein the cutting blades are configured to be thinner on the discharge port side than on the throw-in port side so that a crush size of the shredable object is finer on the discharge port side.

8. The shredding machine of claim 7, wherein the thickness of the cutting blades between the throw-in port side and the discharge port side is configured to be thinner in a stepwise fashion from the throw-in port side.

9. The shredding machine of claim 1, wherein the number of the cutting portions of the cutting blade on the discharge port side is configured to be more than the number of the cutting portions of the cutting blade on the throw-in port side so that a crush size of the shredable object is finer on the discharge port.

10. The shredding machine of claim 1, wherein the cutting blades are arranged so that the cutting portions are arranged in a spiral to assist in causing the shredable object to travel downstream from the throw-in port side to the discharge port side, by rotating.

11. The shredding machine of claim 1, wherein a diameter of the cutting blades on the discharge port side is smaller than a diameter of the cutting blades on the throw-in port side, and a thickness of the cutting blades on the discharge port side is thinner than a thickness of the cutting blades on the throw-in port side so that a crush size is finer.

12. The shredding machine of claim 1, wherein a lower portion of the shredder main body is configured to be a damper gate to open and close, and is configured so that an amount of the shredable object being discharged from the damper gate is adjustable by adjusting an amount of opening and closing the damper gate.

13. The shredding machine of claim 1, wherein the discharge port includes a plurality of discharge ports that are arranged between a position below the throw-in port in the shaft direction of the rotational shafts, each of the discharge ports is provided with an open/close door, respectively, and wherein the plurality of open/close doors are configured to be open and close.

14. The shredding machine of claim 1, wherein a slide gate that is slidable in the longitudinal direction of the rotational shafts is provided to allow the size of an opening of the discharge port to be selectively changed.

15. The shredding machine of claim 1, wherein a foreign object discharge port is provided to the lower portion or side portions of the shredder main body so as to be able to open and close, to discharge a foreign object mixed in the shredable object out of the crusher.

16. The shredding machine of claim 15, wherein a foreign object pocket into which the foreign object enters is provided to the lower portion of the shredder main body, and the foreign object discharge port from which the foreign object being entered into the foreign object pocket is discharged is provided so as to open and close.

17. The shredding machine of claim 16, wherein the foreign object discharge port is constituted by a foreign object discharge slide gate that is slidable in the shaft direction of the shredder main body, and is configured so that the lower portion of the foreign object pocket is openable by sliding the foreign object discharge slide gate.

18. The shredding machine of claim 15, wherein a foreign object pocket into which the foreign object enters is provided to the lower portion of the shredder main body, and a foreign object pusher that extends in the foreign object pocket from the throw-in port side to the discharge port side is provided so that the foreign object that enters into the foreign object pocket is discharged from the discharge port by the foreign object pusher.

19. The shredding machine of claim 15, wherein the foreign object discharge port is constituted by a foreign object discharge side damper for opening a side portion of the shredder main body, and the foreign object discharge side damper is configured to be openable so that the foreign object on an upper portion of the cutting blade is discharged outside the shredder main body.

20. The shredding machine of claim 1, wherein the throw-in port is provided in a central portion of the shredder main body in the longitudinal direction of the rotational shafts, the discharge port comprises discharge ports that are provided in both end portions of the shredder main body in the longitudinal direction of the rotational shafts, and the cutting blades are configured so that the shredable object thrown into the throw-in port is crushed several times while assisting in causing the shredable object to travel downstream from the throw-in port side to both the discharge port sides and scrapes up the shredable object from the lower portion to the upper portion.

21. The shredding machine of claim 1, comprising a driver for independently driving each of the plurality of rotational shafts; and a control device for making the driver independently rotate the plurality of rotational shafts at different rotational speeds.

22. The shredding machine of claim 21, wherein the control device includes a function to drive the plurality of rotational shafts so as to interchange a high speed and a low speed at a predetermined interval.

23. The shredding machine of claim 21, wherein the control device includes a function to selectively perform one of drives of the plurality of rotational shafts among a normal rotation at the same rotational speed, a normal rotation of one rotational shaft at a low speed, and a reverse rotation of one rotational shaft at the low speed.

24. A shredding machine for finely shredding a shredable object, comprising:

a plurality of rotational shafts extending in parallel in a longitudinal direction so as to support cutting blades in the transverse direction inside a shredder main body, wherein the cutting blade is provided with a plurality of cutting portions protruding from the peripheral of the cutting blade, and the cutting blades are disposed in the longitudinal direction of the rotational shafts so that the cutting portions engage with each other;

a throw-in port for the shredable object provided in an upper portion of the shredder main body; and a discharge port for the shredable object provided in a lower portion of the shredder main body;

wherein in order to finely crush the shredable object thrown into the throw-in port, inside the shredder main body, the discharge port is disposed so as to be offset in the longitudinal direction of the rotational shafts with respect to the throw-in port so that the shredable object is scraped up from the lower portion to the upper portion while traveling downstream from a throw-in port side to a discharge port side, to crush the shredable object several times before discharge of portions the crushed object through the discharge port, wherein in order to assist the shredable object in the downstream travel thereof from the throw-in port side to the discharge port side, a scrape-up member that protrudes from a tip-end of the cutting blade is provided so as to rotate with the cutting blade, and which is configured to assist in causing the shredable object to be scraped upwardly as the object is being crushed during the downstream travel thereof from the lower portion on the throw-in port side toward the upper portion on the discharge port side.

25. The shredding machine of claim 24, wherein the scrape-up member is formed with an incline-surfaced cutting portion for scraping up the shredable object by a front surface thereof in the rotational direction, and for assisting in causing the shredable object to travel downstream toward the discharge port side.

26. The shredding machine of claim 24, wherein predetermined perforations are formed in the shredder main body below the throw-in port.

27. The shredding machine of claim 24, wherein the shredder main body is configured to be tilted by arranging that the throw-in port side of the shredder main body is higher than the discharge port side to assist in causing the shredable object to travel downstream from the throw-in port side to the discharge port side using the tilt thereof.

28. The shredding machine of claim 27, wherein the tilt angle of the shredder main body is configured to be variable by providing a driver for raising and lowering the throw-in port side or the discharge port side of the shredder main body.

29. The shredding machine of claim 27, wherein the shredding machine is for finely shredding a soft waste plastic as the shredable object, and wherein the shredder main body is configured tilt by approximately 8 degrees so that it crushes the soft waste plastic thrown into the throw-in port for a plurality of times by traversing the soft waste plastic toward the discharge port side while scraping up the soft waste plastic from the lower portion to the upper portion of the shredder main body.

30. The shredding machine of claim 24, wherein the cutting blades are configured to be thinner on the discharge port side than on the throw-in port side so that a crush size of the shredable object is finer on the discharge port side.

31. The shredding machine of claim 30, wherein the thickness of the cutting blades between the throw-in port side and the discharge port side is configured to be thinner in a stepwise fashion from the throw-in port side.

32. The shredding machine of claim 24, wherein the number of the cutting portions of the cutting blade on the discharge port side is configured to be more than the number of the cutting portions of the cutting blade on the throw-in port side so that a crush size of the shredable object is finer on the discharge port.

33. The shredding machine of claim 24, wherein the cutting blades are arranged so that the cutting portions are arranged in a spiral to assist in causing the shredable object to travel downstream from the throw-in port side to the discharge port side, by rotating.

34. The shredding machine of claim 24, wherein a diameter of the cutting blades on the discharge port side is smaller than a diameter of the cutting blades on the throw-in port side, and a thickness of the cutting blades on the discharge port side is thinner than a thickness of the cutting blades on the throw-in port side so that a crush size is finer.

35. The shredding machine of claim 24, wherein a lower portion of the shredder main body is configured to be a damper gate to open and close, and is configured so that an amount of the shredable object being discharged from the damper gate is adjustable by adjusting an amount of opening and closing the damper gate.

36. The shredding machine of claim 24, wherein the discharge port includes a plurality of discharge ports that are arranged between a position below the throw-in port in the shaft direction of the rotational shafts, each of the discharge ports is provided with an open/close door, respectively, and wherein the plurality of open/close doors are configured to be open and close.

37. The shredding machine of claim 24, wherein a slide gate that is slidable in the longitudinal direction of the rotational shafts is provided to allow the size of an opening of the discharge port to be selectively changed.

38. The shredding machine of claim 24, wherein a foreign object discharge port is provided to the lower portion or side portions of the shredder main body so as to be able to open and close, to discharge a foreign object mixed in the shredable object out of the crusher.

39. The shredding machine of claim 38, wherein a foreign object pocket into which the foreign object enters is provided to the lower portion of the shredder main body, and the foreign object discharge port from which the foreign object being entered into the foreign object pocket is discharged is provided so as to open and close.

40. The shredding machine of claim 39, wherein the foreign object discharge port is constituted by a foreign object discharge slide gate that is slidable in the shaft direction of the shredder main body, and is configured so that the lower portion of the foreign object pocket is openable by sliding the foreign object discharge slide gate.

41. The shredding machine of claim 38, wherein a foreign object pocket into which the foreign object enters is provided to the lower portion of the shredder main body, and a foreign object pusher that extends in the foreign object pocket from the throw-in port side to the discharge port side is provided so that the foreign object that enters into the foreign object pocket is discharged from the discharge port by the foreign object pusher.

42. The shredding machine of claim 38, wherein the foreign object discharge port is constituted by a foreign object discharge side damper for opening a side portion of the shredder main body, and the foreign object discharge side damper is configured to be openable so that the foreign object on an upper portion of the cutting blade is discharged outside the shredder main body.

43. The shredding machine of claim 24, wherein the throw-in port is provided in a central portion of the shredder main body in the longitudinal direction of the rotational shafts, the discharge port comprises discharge ports that are provided in both end portions of the shredder main body in the longitudinal direction of the rotational shafts, and the cutting blades are configured so that the shredable object thrown into the throw-in port is crushed several times while assisting in causing the shredable object to travel downstream from the throw-in port side to both the discharge port sides and scrapes up the shredable object from the lower portion to the upper portion.

44. The shredding machine of claim 24, comprising a driver for independently driving each of the plurality of rotational shafts; and a control device for making the driver independently rotate the plurality of rotational shafts at different rotational speeds.

45. The shredding machine of claim 44, wherein the control device includes a function to drive the plurality of rotational shafts so as to interchange a high speed and a low speed at a predetermined interval.

46. The shredding machine of claim 44, wherein the control device includes a function to selectively perform one of drives of the plurality of rotational shafts among a normal rotation at the same rotational speed, a normal rotation of one rotational shaft at a low speed, and a reverse rotation of one rotational shaft at the low speed.

* * * * *